United States Patent
So et al.

(10) Patent No.: US 10,498,492 B2
(45) Date of Patent: Dec. 3, 2019

(54) METHOD AND DEVICE FOR RECEIVING AND TRANSMITTING INFORMATION IN MULTIMEDIA SYSTEM

(71) Applicant: Samsung Electronics Co., Ltd., Suwon-si, Gyeonggi-do (KR)

(72) Inventors: Young-Wan So, Gunpo-si (KR); Kyung-Mo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/323,612

(22) PCT Filed: Jul. 3, 2015

(86) PCT No.: PCT/KR2015/006873
§ 371 (c)(1),
(2) Date: Jan. 3, 2017

(87) PCT Pub. No.: WO2016/003234
PCT Pub. Date: Jan. 7, 2016

(65) Prior Publication Data
US 2017/0141880 A1  May 18, 2017

(30) Foreign Application Priority Data

Jul. 3, 2014  (KR) .................. 10-2014-0083199

(51) Int. Cl.
*H04L 1/00*  (2006.01)
*H04L 1/08*  (2006.01)
(Continued)

(52) U.S. Cl.
CPC .............. *H04L 1/08* (2013.01); *H04L 1/1678* (2013.01); *H04L 1/188* (2013.01); *H04L 1/1864* (2013.01);
(Continued)

(58) Field of Classification Search
None
See application file for complete search history.

(56) References Cited

U.S. PATENT DOCUMENTS 6,909,718 B1 * 6/2005 Aramaki ............... H04L 1/1614
370/236
6,992,982 B1 * 1/2006 Meyer ................... H04L 1/1628
370/230

(Continued)

FOREIGN PATENT DOCUMENTS

CN  1394029 A  1/2003
CN  101204050 A  6/2008

(Continued)

OTHER PUBLICATIONS

ISO/IEC; Draft Amendment ISO/IEC 23008-1:2013/DAM 1; Information technology—High efficiency coding and media delivery in heterogeneous environments—Part 1: MPEG media transport (MMT); Amendment 1: Additional technologies for MPEG Media Transport (MMT); Jan. 13, 2014; Geneva, Switzerland.

(Continued)

*Primary Examiner* — Mujtaba M Chaudry
(74) *Attorney, Agent, or Firm* — Jefferson IP Law, LLP

(57) ABSTRACT

A method for transmitting, by a transmission entity, a packet in a system, according to an embodiment of the present invention, comprises the steps of: transmitting an automatic repeat request (ARQ) configuration (AC) message including ARQ configuration information; receiving an ARQ feedback (AF) message indicating that one or more packets are lost, the AF message including information on a propagation delay for packets to arrive at a receiving entity; identifying a delivery time of the packets between the receiving entity and the transmitting entity based on the propagation delay (Continued)

included in the AF message; and determining whether to transmit one or more lost packets based on the delivery time.

22 Claims, 12 Drawing Sheets

(51) Int. Cl.
    *H04N 21/236*     (2011.01)
    *H04L 1/18*     (2006.01)
    *H04N 21/442*     (2011.01)
    *H04N 21/6375*     (2011.01)
    *H04N 21/658*     (2011.01)
    *H04L 1/16*     (2006.01)

(52) U.S. Cl.
    CPC ......... *H04L 1/1896* (2013.01); *H04N 21/236* (2013.01); *H04N 21/44209* (2013.01); *H04N 21/6375* (2013.01); *H04N 21/6582* (2013.01)

(56) References Cited

U.S. PATENT DOCUMENTS

| | | | | |
|---|---|---|---|---|
| 7,145,889 | B1* | 12/2006 | Zhang | H04L 1/1671 370/329 |
| 7,502,818 | B2 | 3/2009 | Kohno et al. | |
| 8,018,973 | B2 | 9/2011 | Ryu et al. | |
| 2002/0004838 | A1* | 1/2002 | Hakenberg | H04L 1/1678 709/231 |
| 2002/0196812 | A1 | 12/2002 | Yamaguchi et al. | |
| 2003/0126238 | A1 | 7/2003 | Kohno et al. | |
| 2006/0274712 | A1 | 12/2006 | Malladi et al. | |
| 2007/0060146 | A1 | 3/2007 | Won et al. | |
| 2007/0115841 | A1* | 5/2007 | Taubman | H04L 1/1812 370/252 |
| 2007/0127516 | A1 | 6/2007 | Czaja et al. | |
| 2007/0189184 | A1 | 8/2007 | Ryu et al. | |
| 2007/0283032 | A1* | 12/2007 | Kim | H04L 1/1685 709/230 |
| 2009/0201794 | A1* | 8/2009 | Luo | H04J 15/00 370/206 |
| 2010/0177676 | A1* | 7/2010 | Wang | H04L 1/1854 370/312 |
| 2010/0260180 | A1* | 10/2010 | Wu | H04L 1/1819 370/390 |
| 2012/0327803 | A1* | 12/2012 | Lee | H04W 72/1221 370/252 |
| 2013/0021982 | A1 | 1/2013 | Kim et al. | |
| 2013/0070686 | A1 | 3/2013 | Le et al. | |
| 2013/0303199 | A1* | 11/2013 | Siomina | H04W 64/00 455/456.5 |
| 2013/0336174 | A1 | 12/2013 | Rubin et al. | |
| 2014/0029586 | A1* | 1/2014 | Loehr | H04W 56/0005 370/336 |
| 2014/0140456 | A1* | 5/2014 | Tavildar | H04J 3/0641 375/354 |

FOREIGN PATENT DOCUMENTS

| | | |
|---|---|---|
| CN | 101228731 A | 7/2008 |
| CN | 102057609 A | 5/2011 |
| CN | 103354615 A | 10/2013 |
| JP | S59-083431 A | 5/1984 |
| JP | H09-186679 A | 7/1997 |
| JP | 2001-274861 A | 10/2001 |
| JP | 2011-205633 A | 10/2011 |
| KR | 10-2005-0044219 A | 5/2005 |

OTHER PUBLICATIONS

Japanese Office Action with English translation dated May 7, 2019; Japanese Appln. No. 2017-500081.
Chinese Office Action with English translation dated Dec. 28, 2018; Chinese Appln. No. 201580047294.6.
Chinese Office Action with English translation dated Jul. 5, 2019; Chinese Appln. No. 201580047294.6.

\* cited by examiner

METHOD AND DEVICE FOR RECEIVING AND TRANSMITTING INFORMATION IN MULTIMEDIA SYSTEM

CROSS-REFERENCE TO RELATED APPLICATION(S)

This application is a U.S. National Stage application under 35 U.S.C. § 371 of an International application filed on Jul. 3, 2015 and assigned application number PCT/KR2015/006873, which claimed the benefit of a Korean patent application filed on Jul. 3, 2014 in the Korean Intellectual Property Office and assigned Serial number 10-2014-0083199, the entire disclosure of which is hereby incorporated by reference.

TECHNICAL FIELD

The present invention relates to a method and device for transmitting and receiving information in a multimedia system.

BACKGROUND ART

A Moving Picture Experts Group (MPEG) Media transport Technology (MMT), which is one of technologies of transmitting information in a multimedia system, transmits and receives information using an Automatic Repeat Request (ARQ) method.

A transmitting entity in the ARQ method of the conventional MMT system decides whether to support the ARQ for each Asset, however it does not notify a receiving entity of whether to support the ARQ. In this case, a problem may occur, in which the receiving entity may not know whether or not to receive a reply when lost packets are requested again, and for a seamless service, the transmitting entity or an ARQ server has to store MMT packets for all assets owned by themselves for a predetermined time or more. Here, the transmitting entity may perform an operation of the ARQ server, which stores and transmits a retransmission packet.

In addition, when the ARQ request is made by the transmitting entity, the MMT ARQ message may be made by only one kind of combination of Packet_ID and PACKET_SEQUENCE_NUM and the retransmission request may be made by the MMT ARQ message, and which means that the retransmission request is possible only in a packet unit. However, the MMT system includes not only MMT packets but also various levels of media units, such as a Media Processing Unit (MPU), a Media Fragments Unit (MFU), a sample and the like, and when the receiving entity may request a desired level of media unit, a more useful data recovery is possible.

FIG. 1 illustrates an example of applying an ARQ method in a conventional MMT system.

Referring to FIG. 1, a transmitting entity 100 determines a retransmission delay time (Dt) value (indicated by reference numeral 101), transmits an ARQ Configuration (AC) message including information related to the determined Dt value to a receiving entity 200 (indicated by reference numeral 103). Thereafter, when the receiving entity 200 successfully receives a packet N−1 and a packet N+1, and fails to receive a packet N (indicated by reference numerals 105 to 109), the receiving entity 200 calculates an arrival deadline time (Arrival_Deadline) value (indicated by reference numeral 109) and does not perform an additional operation for receiving a packet to the extent of the calculated Arrival_Deadline value. Here, the Arrival_Deadline value is calculated based on the Dt value and an ARQ feedback delay time (Df) value.

In addition, the receiving entity 200 transmits, to the transmitting entity 100, an ARQ feedback (AF) message requesting retransmission of the packet N which has not been received (indicated by reference numeral 113). Here, the AF message includes information related to the Arrival_Deadline value and information related to ARQ feedback time stamp.

The transmitting entity 100 checks the Df value, the Round Trip Time (RTT) value, and information related to the Arrival_Deadline value from the received AF message (indicated by reference numerals 115 to 119), and determines whether the RTT value is smaller than the Arrival_Deadline value (indicated by reference numeral 121). In addition, when the RTT value is smaller than the Arrival_Deadline value, the transmitting entity 100 may retransmit the packet N (indicated by reference numeral 122), and when the value of the RTT is not smaller than the Arrival_Deadline value, the transmitting entity 100 is in a standby state until the Arrival_Deadline value is terminated.

That is, the conventional ARQ method described in FIG. 1 is a scheme where the receiving entity 200 transmits the Arrival_Deadline value to the transmitting entity 100, and when a packet for which the retransmission is requested is not transmitted to the final receiving entity 200 to the extent of the Arrival_Deadline value, the transmitting entity 100 gives up a response transmission itself. However, since the Arrival_Deadline value may be known when the receiving entity 200 checks all of the receiving packets and recovery media, there is a problem of consuming a large amount of time and resources in order for the receiving entity 200 to derive the Arrival_Deadline value. In addition, when the transmitting entity 100 gives up the response transmission, a problem may occur in that the receiving entity 200 does not recognize thereof and has to wait until the Arrival_Deadline value is terminated.

Thus, since the conventional MMT system may not provide the valid period information of Asset Delivery Characteristic (ADC) information representing individual transmission characteristic values of each of the Assets, a scheme for solving this problem is required. On the other hand, MMT media data, which is transmitted from a specific transmitting entity to a receiving entity, is often transmitted by combining Assets having higher relevance and grouping the same in a bundle unit as well as in one asset. Therefore, the network may easily manage Bundle Delivery Characteristics (BDC) information in the bundle unit, rather than controlling and managing the Asset unit. However, in the conventional MMT system, ADC information is provided in the Asset unit which corresponds to each individual media, and in this case, since the discovery and management of ADC information are performed in the Asset units, from the point of view of a network entity for the server/MMT (MMT aware network entity: MANE), unnecessary information may be provided. In addition, there is a means for providing the importance on data to be transmitted at each separate packet level, and priority information thereof, however not only bundle information which is information on the bundle of Assets at a media level which has a proper relationship but also relative priority information between bundles within the bundle, Assets within the bundle, and Assets are not given.

DETAILED DESCRIPTION OF THE INVENTION

Technical Problem

An embodiment of the present invention provides a method and apparatus for transmitting and receiving information in a multimedia system.

In addition, an embodiment of the present invention provides a method and apparatus for transmitting and receiving information based on an ARQ method in a multimedia system.

In addition, an embodiment of the present invention provides a method and apparatus for configuring a bundle which is a group of Assets in a multimedia system, and transmitting and receiving information based on delivery characteristic information of each bundle.

Technical Solution

According to an embodiment of the present invention, a method for transmitting, by a transmitting entity, a packet in a system is provided. The method includes: transmitting an automatic repeat request (ARQ) configuration (AC) message including ARQ configuration information; receiving an ARQ feedback (AF) message indicating that one or more packets are lost, the AF message including information on a propagation delay for packets to arrive at a receiving entity; identifying a delivery time of the packets between the receiving entity and the transmitting entity based on the propagation delay included in the AF message; and determining whether to transmit one or more lost packets based on the delivery time.

In addition, according to an embodiment of the present invention, a method for receiving, by a receiving entity, a packet in a system is provided. The method includes: receiving an automatic repeat request (ARQ) configuration (AC) message including ARQ configuration information; transmitting an ARQ feedback (AF) message indicating that one or more packets are lost, the AF message including information on a propagation delay for packets to arrive at the receiving entity; and receiving one or more lost packets if transmission of the one or more lost packets is determined based on a delivery time, wherein the delivery time is identified based on the propagation delay.

In addition, according to an embodiment of the present invention, an apparatus for transmitting, by a transmitting entity, a packet in a system is provided. The apparatus includes: a transceiver configured to transmit and receive data; and a controller configured to: transmit an automatic repeat request (ARQ) configuration (AC) message including ARQ configuration information, receive an ARQ feedback (AF) message indicating that one or more packets are lost, the AF message including information on a propagation delay for packets to arrive at a receiving entity, identify a delivery time of the packets between the receiving entity and the transmitting entity based on the propagation delay included in the AF message, and determine whether to transmit one or more lost packets based on the delivery time.

In addition, according to an embodiment of the present invention, an apparatus for receiving, by a receiving entity, a packet in a system is provided. The apparatus includes: a transceiver configured to transmit and receive data; and a controller configured to: receive an automatic repeat request (ARQ) configuration (AC) message including ARQ configuration information, transmit an ARQ feedback (AF) message indicating that one or more packets are lost, the AF message including information on a propagation delay for packets to arrive at the receiving entity, and receive one or more lost packets if transmission of the one or more lost packets is determined based on a delivery time, wherein the delivery time is identified based on the propagation delay.

MODE FOR CARRYING OUT THE INVENTION

Figure 1:
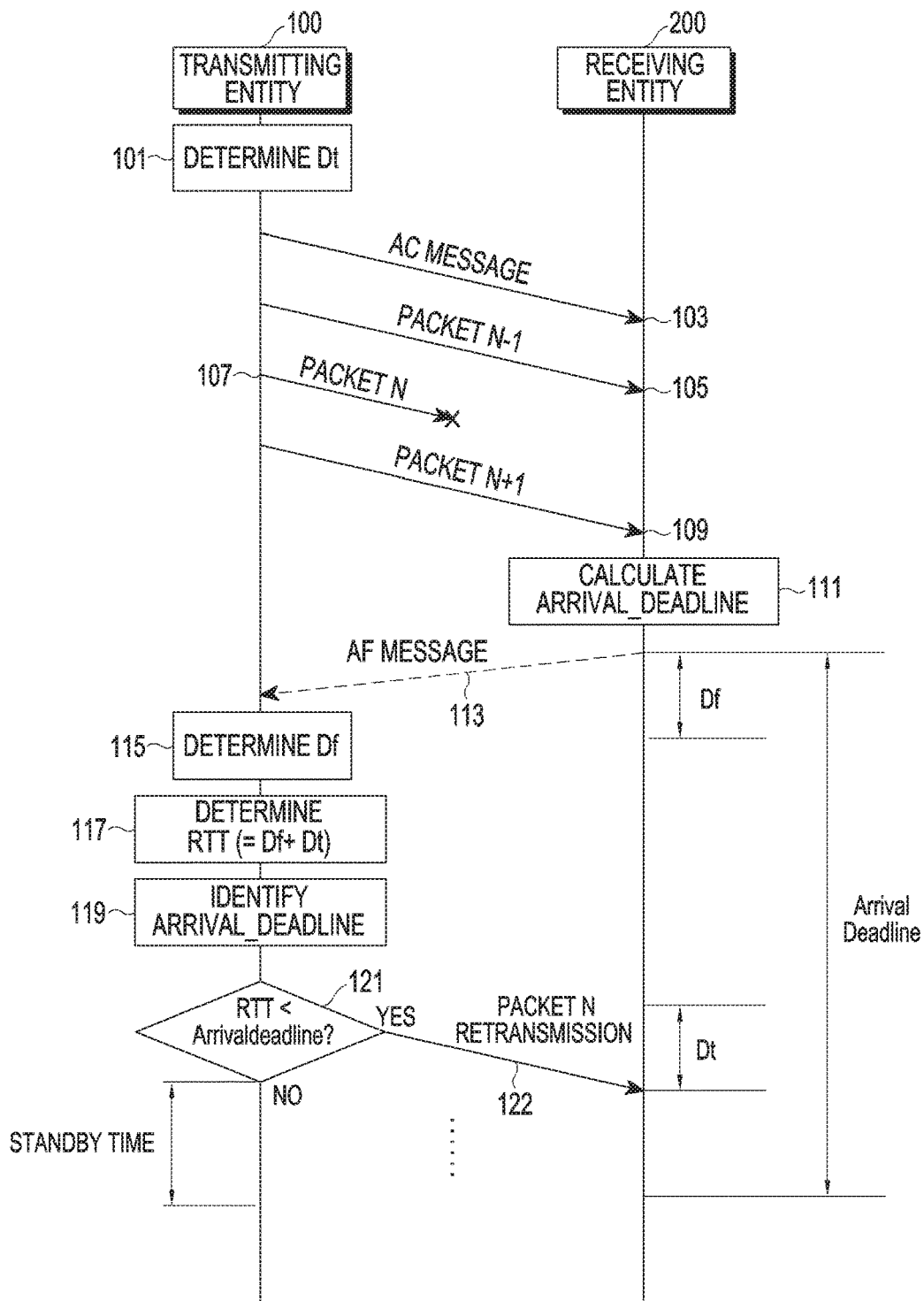
FIG. 1 illustrates an example of applying an ARQ method in the prior MMT system.

Hereinafter, an exemplary embodiment of the present invention will be described in detail with reference to the accompanying drawings. In the following description, it should be noted that only portions required for comprehension of operations according to the embodiments of the present invention will be described and descriptions of other portions will be omitted not to make subject matters of the present invention obscure.

The subject matter of the present invention is to provide an apparatus and method for retransmitting and receiving a lost packet, among packets transmitted by a transmitting entity in an MMT system, within a limited time in the delay-constrained environment. More specifically, the present invention relates to an apparatus and method, which (1) explicitly individually indicate, to an MMT receiving entity, whether an ARQ method can be used by each Asset and address of an ARQ server, (2) individually indicate whether the receiving entity may made the ARQ request using what kind of factors, (3) when a Delay-Constrained ARQ request is made, determine whether the receiving entity transmits an ARQ request message by comparing an RTT value with fixed_end_to_end_delay or max_end_to_end_delay of a Hypothetical Receiver Buffer Model (HRBM) message which is a message for managing a receive entity buffer, and (4) when the Delay-Constrained ARQ request is made, determine whether the transmitting entity transmits a response message for a packet requested from the receiving entity by comparing the RTT value with fixed_end_to_end_delay or max_end_to_end_delay of the Hypothetical Receiver Buffer Model (HRBM) message which is the message for managing the receive entity buffer.

To this end, a method and an apparatus for transmitting and receiving information in a multimedia system according to an embodiment of the present invention will be described in detail. Hereinafter, description will be made on the assumption that the multimedia system is an MMT system, for example.

First, the present invention will describe whether to apply ARQ and a method of using factors in the MMT system according to an embodiment of the present invention.

The MMT ARQ method uses an AC message in order to configure an ARQ operation of the receiving entity. An embodiment of the present invention defines the parameter values as follows, in order to use the AC message.

k1) ARQ_support_flag is a flag indicating whether (packet_id) ARQ can be used for the corresponding Asset, and indicates, when the flag is set to 1, that the receiving entity can receive the corresponding packet from the ARQ server, when there is a loss of a packet belonging to the corresponding packet_id. As another embodiment, when it is configured that rtx_window_timeout=0 without using the ARQ_support_flag, the corresponding Asset does not support the packet retransmission.

2) arq_server_address means the address of the ARQ server which can receive the retransmission packet when an AF message is transmitted by the receiving entity.

3) arq_type indicates what type of request message can be transmitted by the receiving entity when transmitting the AF message. In the following Table 1, for a case of '00', a packet to be retransmitted can be indicated by using the packet_counter of MMT packet header, and for a case of '01', a packet to be retransmitted can be indicated by combining packet_id of the MMT packet header and packet_sequence_number.

The following Table 1 is a table showing information included in the AC message according to an embodiment of the present invention.

TABLE 1

| Syntax | Values | No. of bits | Mnemonic |
|---|---|---|---|
| AC_message( ) { | | | |
|   message_id | | 16 | |
|   version | | 8 | |
|   length | | 16 | |
|   message_payload{ | | | |
|     flow_label_flag | | 1 | boolean |
|     if(flow_lable_flag == 1) { | | | |
|       fb_flow_label | | 7 | uimsbf |
|     } | | | |
|     number_of_packet_id | | 32 | uimsbf |
|     for(i=0;i<N1;i++){ | | | |
|       packet_id | | 16 | uimsbf |
|       ARQ_support_flag | N1 | 1 | boolean |
|       rtx_window_timeout | | 32 | uimsbf |
|     } | | | |
|     arq_type | | 2 | uimsbf |
|     arq_server_address{ | | | |
|       MMT_general_location_info( ) | | | |
|     } | | | |
|   } | | | |
| } | | | |

In Table 1, each syntax has a meaning (description) shown in Table 2 below.

Table 2

The valid values for arq_typ field in Table 1 may be defined in Table 3 below.

TABLE 3

| Value | Description |
|---|---|
| 00 | AF massage with packet_counter is possible. |
| 01 | AF message with packet_id + packet_sequence_number is possible |
| 10 | AF message with delay-constraint argument is possible |
| 11 | reserved for future use |

Next, in the MMT ARQ, when the packet retransmission is required, the MMT receiving entity configures the AF message and transmit the same to the ARQ server. Here, the AF message has to be reconstructed as shown in Table 4 according to an embodiment of the present invention.

TABLE 4

| Syntax | Values | No. of bits | Mnemonic |
|---|---|---|---|
| AF_message( ) { | | | |
|     message_id | | 16 | uimsbf |
|     version | | 8 | uimsbf |
|     length | | 16 | uimsbf |
|     message_payload { | | | |
|     argument_type | | 1 | boolean |
|     delay_constrained_ARQ_mode | | 2 | uimsbf |
|     if(argument_type == 0) { | | | |
|         if (delay_constrained_ARQ_mode ==01){ | | | |
|             ARQ_feedback_timestamp | | 32 | uimsbf |
|         } | | | |
|         if (delay_constrained_ARQ_mode ==10){ | | | |
|             propagation_delay | | 32 | uimsbf |
|         } | | | |
|         packet_counter | | 32 | uimsbf |
|         masklength | | 8 | uimsbf |
|         if (delay_constrained_ARQ_mode ==01){ | | | |
|             arrival_deadline | | 16 | uimsbf |
|         } | | | |
|         for(i=0; i<masklength; i++){ | | | |
|             mask_byte | | 8 | uimsbf |
|         }/* end of for */ | | | |
|     }/* end of if */ | | | |
|     if(argument_type == 1) { | | | |
|         number_of_packet_id | | | |
|         if (delay_constrained_ARQ_mode ==01){ | N1 | 7 | uimsbf |
|             ARQ_feedback_timestamp | | | |
|         } | | 32 | uimsbf |
|         if (delay_constrained_ARQ_mode ==10){ | | | |
|             propagation_delay | | | |
|         } | | 32 | uimsbf |
|         for(i=0; i<N1; i++){ | | | |
|             packet_id | | | |
|             packet_sequence_number | | 16 | uimsbf |
|             masklength | | 32 | uimsbf |
|             if (delay_constrained_ARQ_mode ==01){ | | 8 | uimsbf |
|                 arrival_deadline | | | |
|             } | | 16 | uimsbf |
|             for(i=0; i<masklength; i++){ | | | |
|                 mask_byte | | | |
|             }/* end of for */ | | 8 | uimsbf |
|         }/* end of for */ | | | |
|     }/* end of if */ | | | |
|     }/* end of message payload */ | | | |
| } | | | |

In Table 4, each syntax has a meaning (description) shown in Table 5 below.

TABLE 5

| syntax | Description |
|---|---|
| message_id | It indicates AF message ID. The length of this field is 16 bits. |
| version | It indicates the version of AF messages. MMT receiving entity may check whether the received message is new or not. The length of this field is 8 bits. |
| length | It indicates the length of AF messages. The length of this field is 16 bits. It indicates the length of the AF message counted in bytes starting from the next field to the last byte of the AF message. The value '0' shall not be used. |
| number_of_packet_id | This field indicates the number of packet id that has lost packets. |
| delay_constrained_ARQ_flag | This flag indicates the present of arrival_deadline field information. |
| ARQ_feedback_timestamp | indicates the NTP time at which the ARQ feedback is sent from the MMT receiving entity. |
| packet_id | This field is the integer value assigned to each Asset to distinguish packets of one Asset from another. Separate value will be assigned to signaling messages and FEC parity flows. |
| packet_sequence_number | This field corresponds to the packet_sequence_number of the 1st packet indicated by the mask_byte that is identified as having been detected to be lost and hence requiring re-transmission. |
| mask_length | It indicates the length of the data behind the mask in bytes. |
| arrival_deadline | indicates the deadline by which the retransmitted packet for the first lost packet should arrive at the MMT receiving entity for timely processing. This parameter represents the time increment from the |

TABLE 5-continued

| syntax | Description |
| --- | --- |
| | ARQ_feedback_timestamp. The first 8 bits represents integer part and the last 8 bits represents fractional part. |
| mask_byte | Mask field, each bit correspond to a MMTP packet. If the packet behind the packet with packet_id is lost, then the corresponding bit will be set to '1'. |
| argument_type | This field indicates the type of argument the MMT receiving entity is using when requesting the lost data to server. Valid values for this field are described in <table 6>. |
| delay_constrained_ARQ_mode | This field indicates the type of delay constrained ARQ. Valid values for this field are described in <table 7>. |

In Table 5, effective values for the argument_type field are defined in Table 6 below, and effective values for the delay_constrained_ARQ_mode field can be defined in Table 7 below.

TABLE 6

| Value | Description |
| --- | --- |
| 0 | Packet counter based ARQ MMT receiving entity can send AF message with packet_counter |
| 1 | Packet sequence number based ARQ. MMT receiving entity can send AF message with packet_id and packet_sequence_number. |

TABLE 7

| Value | Description |
| --- | --- |
| 00 | No time constrained ARQ. Server does not consider any time restrictions. |
| 01 | Playout-time constrained ARQ. MMT receiving entity send AF message with ARQ_feedback_timestamp and arrival_deadline. |
| 10 | Delivery-time constrained ARQ. MMT receiving entity send AF message with Propagation_delay. |
| 11 | Reserved for future use |

Figure 2:
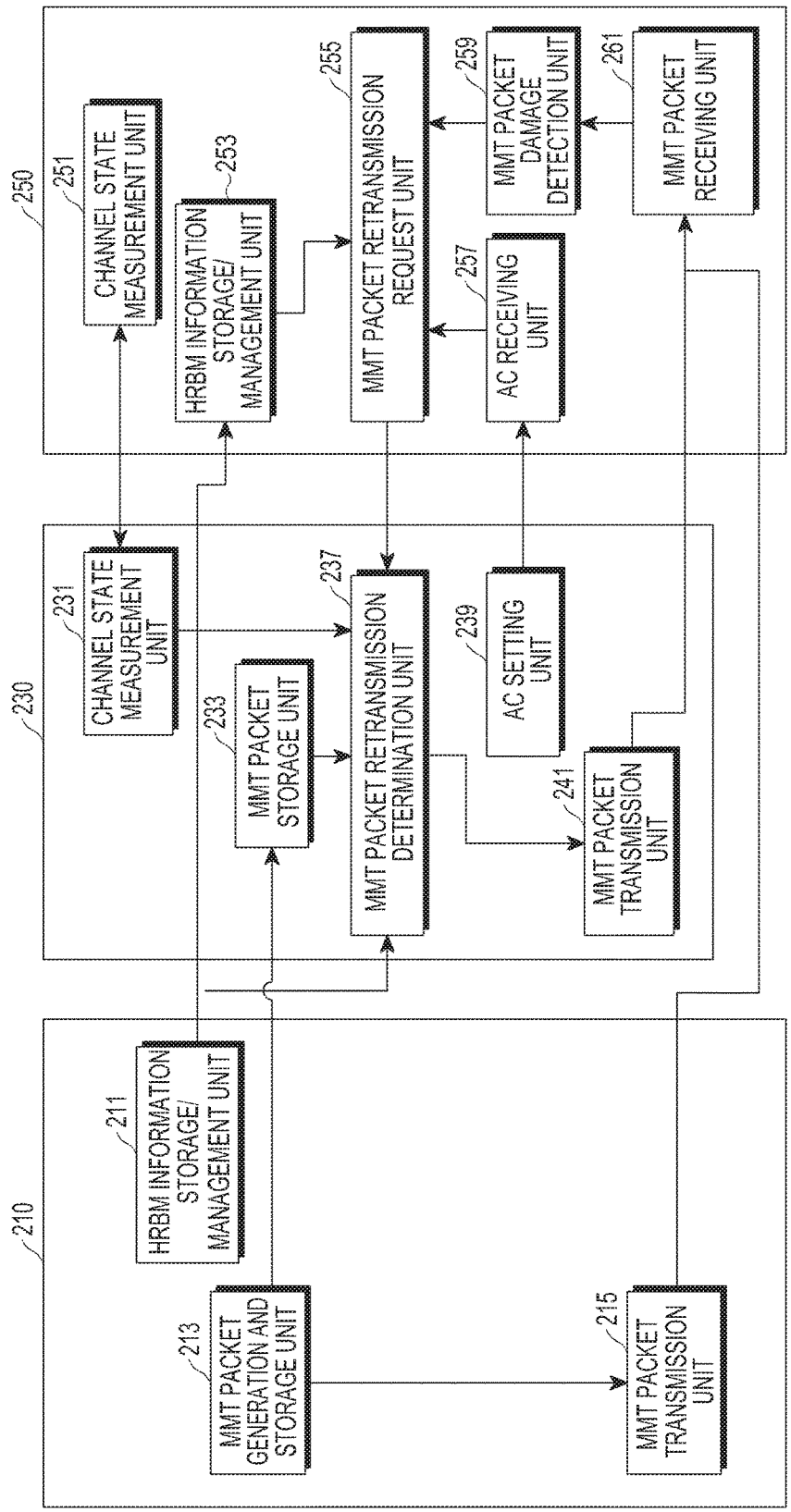
FIG. 2 is a diagram illustrating a configuration of each node in an MMT system according to an embodiment of the present invention.

FIG. 2 illustrates the configuration of each node in an MMT system according to an embodiment of the present invention.

Referring to FIG. 2, the system includes a transmitting entity 210 which is a transmitting node of an MMT packet, a receiving entity 250 which is a receiving node of the MMT packet, and an ARQ server 230 for storing and transmitting the retransmission packet. Here, the transmitting entity 210 may have functions of the ARQ server 230.

An MMT packet generation and storage unit 213 included in the transmitting entity 210 is a module for MMT packetizing an Asset, an HRBM information storage/management unit 211 is a module for generating HRBM information to manage the receiving entity buffers, and storing and transmitting the same, and an MMT packet transmitting unit 215 is a module for transmitting the generated MMT packet. In particular, the transmitting entity 210 performs an operation for transmitting and receiving information in accordance with an embodiment of the present invention, and a detailed operation thereof will be described in detail with reference to FIGS. 3 to 8 below.

The channel state measurement unit 231 included in the ARQ server 230 is a module for, when the AF message is received from the receiving entity 250, measuring the RTT with the receiving entity 250 in order to determine whether the retransmission packet can be properly delivered to the receiving entity within a time. In addition, an MMT packet storage unit 233 is a module for previously receiving the corresponding packets from the transmitting entity 210 and copying/storing the same, in order to transmit the packet for which the retransmission has requested from the receiving entity 250. An MMT packet retransmission determination unit 237 is a module for determining, when the AF message is received from the receiving entity 250, whether the retransmission packet is properly delivered to the receiving entity 250 within a time, and a module which is characterized in that the determination is made by comparing max_end_to_end_delay or fixed_end_to_end_delay information of the HRBM information and the RTT with the receiving entity 250. In addition, an MMT packet transmission unit 241 is a module for transmitting the generated MMT packet, and an AC setting unit 239 is a module for generating/storing/transmitting ARQ setting information. In particular, the ARQ server 230 performs an operation for transmitting and receiving information according to an embodiment of the present invention, and a detailed operation thereof will be described with reference to FIG. 3 to FIG. 8 in the following.

A channel state measuring unit 251 included in the receiving entity 250 is a module for measuring, when the packet retransmission request is made, the RTT with the ARQ server in order to determine whether the retransmitted packet is properly received within a time. In addition, an MMT packet retransmission request unit 255 is, when the lost packet is detected, a module for transmitting the ARQ request, and which is characterized in that whether the retransmitted packet is properly delivered within a time is identified by comparing max_end_to_end_delay or fixed_end_to_end_delay information of the HRBM information and the RTT with a receiving entity 250, and if required, the MMT packet retransmission request unit 255 determines whether to transmit the retransmission request message itself. An AC receiving unit 257 is a module for receiving/storing the ARQ setting information, and an MMT packet receiving unit 261 is a module for receiving the transmitted MMT packet. An MMT packet loss detection unit 259 is a module for detecting whether the transmitted MMT packets are lost or received, and an HRBM information storage/management unit 253 is a module for receiving and storing the HRBM information for managing the receiving entity buffer. In particular, the receiving entity 250 performs an operation for transmitting and receiving information in accordance with an embodiment of the present invention, a detailed operation thereof will be described in detail with reference to FIGS. 3 to 8 below.

On the other hand, although FIG. 2 illustrates detail units included in the transmitting entity 210, the ARQ server 230 and the receiving entity 250, at least two of the detailed units illustrated in each device may be implemented in an integrated form. In addition, detailed units illustrated in each device may be implemented by one processor.

Figure 3:
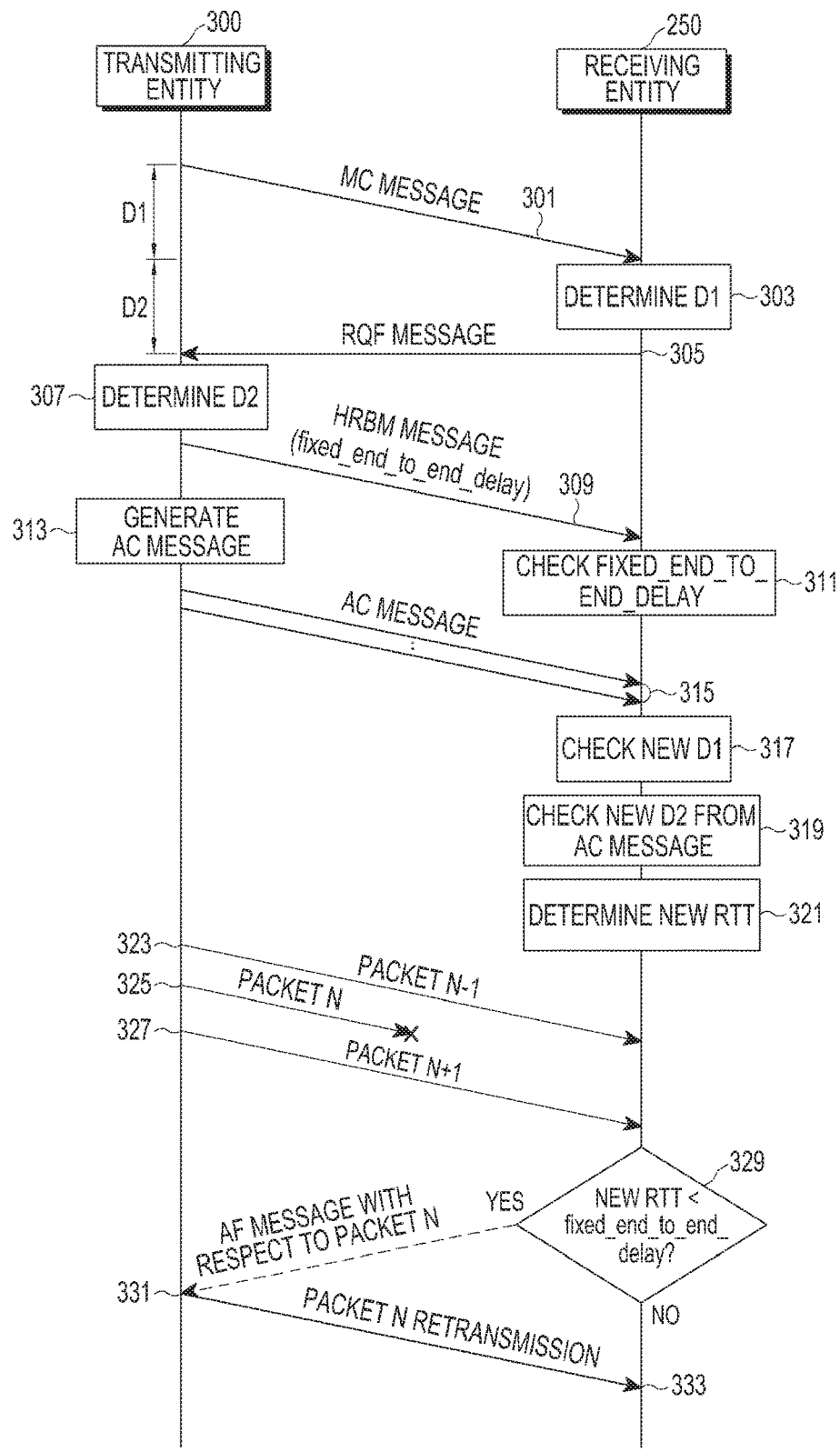
FIG. 3 illustrates a method for transmitting and receiving information in an MMT system according to a first embodiment of the present invention.

FIG. 3 illustrates a method for transmitting and receiving information in the MMT system according to a first embodiment of the present invention. A first embodiment of the present invention is a method for transmitting and receiving information in a case whether the retransmission request for the lost packet is determined by the receiving entity 250.

Referring to FIG. 3, the transmitting entity 300 transmits a measurement configuration (MC) message to the receiving entity 250 (indicated by reference numeral 301). Then, the receiving entity 250 checks a time at which the MC message is received, determines a propagation delay time (D1) value for the packet, from the transmitting entity 300 to the receiving entity 250 (indicated by reference numeral 303), and transmits a reception quality feedback (RQF) message including information related to the determined D1 value to the transmitting entity 300 (indicated by reference numeral 305).

The transmitting entity 300 determines an uplink delay time (D2) value based on information related to D1 value included in the received RQF message (indicated by reference numeral 307). The D2 value may be determined based on the difference between Feedback timestamp and timestamp. In addition, the transmitting entity 300 transmits a HRBM message including information relating to fixed_end_to_end_delay value to the receiving entity 250 (indicated by reference numeral 309). The receiving entity 250 checks the information related to fixed_end_to_end_delay value included in the received HRBM message (indicated by reference numeral 311).

In addition, the transmitting entity 300 generates an AC message including information related to the latest D2 value (indicated by reference numeral 313), and repeatedly transmit the generated AC message to the receiving entity 250 (indicated by reference numeral 315). The receiving entity 250 checks a new D1 value from the received AC message (indicated by reference numeral 317), checks the information related to a new D2 value included in the AC message (indicated by reference numeral 319), and determines a new RTT value (indicated by reference numeral 321). Here, the new RTT value is determined on the basis of the new D1 value and new D2 value.

Thereafter, when the receiving entity 250 successfully receives the packet N−1 and packet N+1 and fails to receive the packet N from the transmitting entity 300 (indicated by reference numerals 323 to 327), it is determined by using the new RTT value whether the packet retransmission request is made on the basis of the fixed_end_to_end_delay value (indicated by reference numeral 329). That is, when the new RTT value is shorter than the fixed_end_to_end_delay value (that is, when the packet retransmission request is made, the retransmission packet can be properly received within a limited time), the receiving entity 250 transmits the AF message for the packet N to the transmitting entity 300 (indicated by reference numeral 331) and receives again the packet N from the transmitting entity 300 (indicated by reference numeral 333). On the other hand, when the new RTT value is longer than the fixed_end_to_end_delay value (that is, in a case where the packet retransmission request is made, but the retransmission packet reception has failed within a limited time), the receiving entity 250 does not request the retransmission of the lost packets.

On the other hand, when the RTT value is equal to the fixed_end_to_end_delay value, the transmitting entity 300 may retransmit or not the requested packets according to an embodiment implemented for packet retransmission.

As described above, the first embodiment of the present invention allows the receiving entity 250 to compare information included in the HRBM message with information related to the RTT value, rather than allowing the receiving entity 250 to unconditionally perform the retransmission request and then allowing the transmitting entity 300 to perform a response in the Delay-constrained ARQ environment, and when it is determined that the packet reception has failed within a limited time, the first embodiment of the present invention may not transmit the retransmission request itself. In this case, as an example of FIG. 3, when the determination is made by using information relating to the max_end_to_end_delay value or fixed_end_to_end_delay value within the HRBM message, since it is not necessary for the receiving entity 250 to check all of the received packets to recover the media, time and resources consumed for the retransmission request can be minimized. In addition, since the receiving entity 250 performs the judgement on the retransmission request, the waiting time for unnecessary retransmission response can be reduced.

Figure 4:
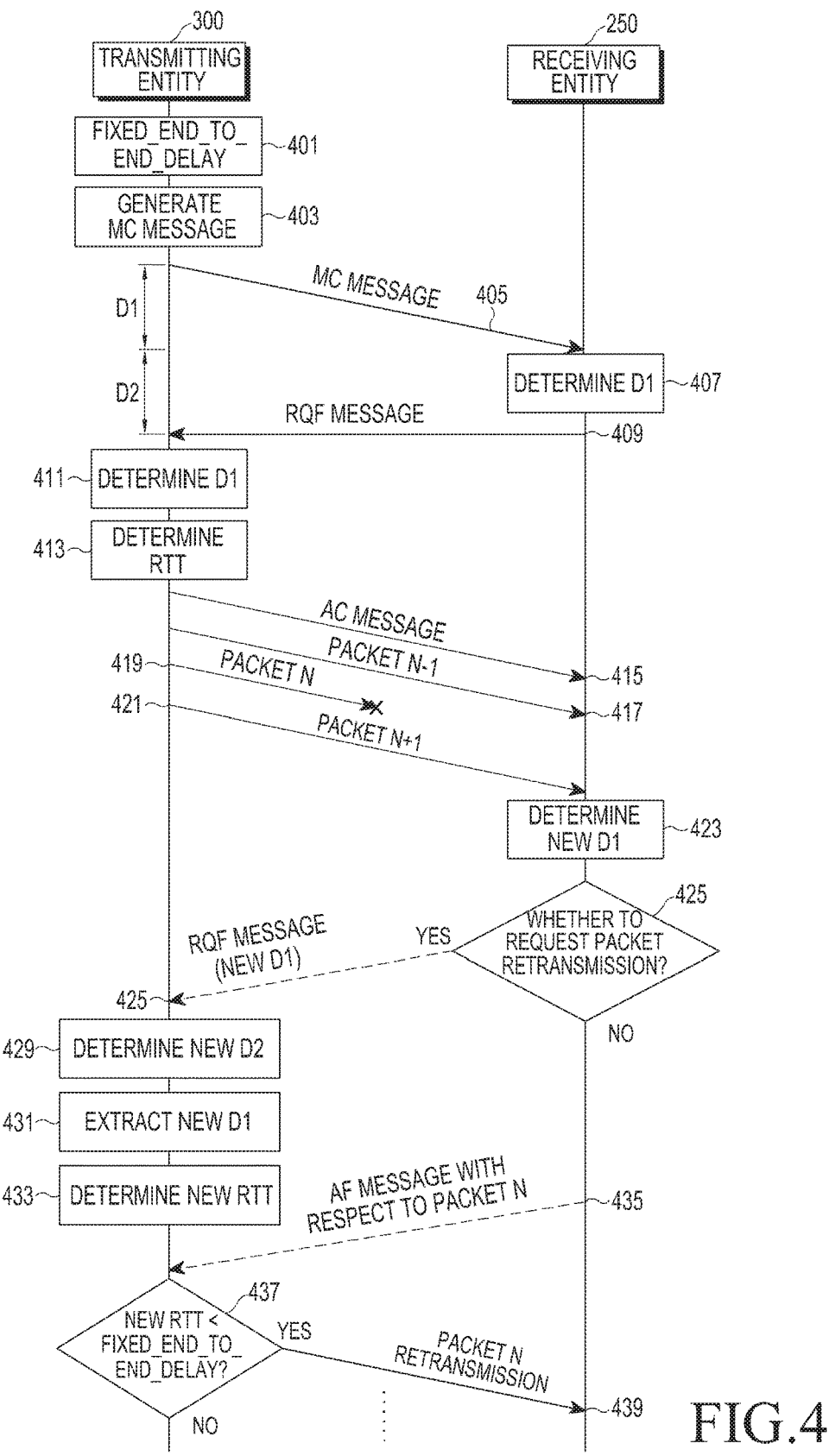
FIG. 4 illustrates a method for transmitting and receiving information in an MMT system according to a second embodiment of the present invention.

FIG. 4 illustrates a method for transmitting and receiving information in the MMT system according to a second embodiment of the present invention.

The second embodiment of the present invention relates to a method for transmitting and receiving information when the transmitting entity 300 determines whether to request the retransmission of the lost packet and, more particularly, to a case where the transmitting entity 300 measures the RTT value using an RQF message.

In the delay-constrained ARQ environment, the transmitting entity 300 checks information related to the fixed_end_to_end_delay value included in the HRBM message (indicated by reference numeral 401). In addition, when the ARQ request is made by the receiving entity 250, the transmitting entity 300 generates an MC message including the condition allowing the delivering of the D1 value (indicated by reference numeral 403), and transmits the generated MC message to the receiving entity 250.

The receiving entity 250 determines the D1 value based on the received MC message, and transmits the RQF message including information related to the D1 value to the transmitting entity 300 (indicated by reference numeral 409). Then, the transmitting entity 300 determines a D2 value on the basis of the RQF message (indicated by reference numeral 411), and sums up the D1 value and D2 value to calculate an RTT value (indicated by reference numeral 413).

Thereafter, the transmitting entity 300 transmits the AC message to the receiving entity 250, the receiving entity 250 confirms that the packet N−1 and the packet N+1 are successfully received and the packet N fails to be received from the transmitting entity 300 (indicated by reference numerals 417 to 421). In addition, the receiving entity 250 determines a new D1 value based on the AC message and determines whether to request the packet N retransmission (indicated by reference numeral 425). If the packet retransmission request is determined by the receiving entity 250, the receiving entity 250 transmits the RQF message including information related to the new D1 value to the transmitting entity 300 (indicated by reference numeral 425). In addition, the transmitting entity 300 determines a new D2 value based on the received RQF message (indicated by reference numeral 429), and checks information related to the new D1 value included in the RQF message to determine a new RTT value (indicated by reference numerals 431 and 433).

In addition, when the AF message requesting the packet N retransmission is received from the receiving entity 250 (indicated by reference numeral 435), the transmitting entity 300 determines whether the new RTT value is smaller than the fixed_end_to_end_delay value (indicated by reference numeral 437). If the new RTT value is smaller than the fixed_end_to_end_delay value, the transmitting entity 300 retransmits the packet N to the receiving entity 250.

On the other hand, if the new RTT value is equal to the fixed_end_to_end_delay value, the transmitting entity 300 may retransmit or not the packet N for which the retransmission is requested according to an embodiment implemented for the packet retransmission.

As described above, in a second embodiment of the present invention, since the transmitting entity 300 may already know information related to the max_end_to_end_delay value and fixed_end_to_end_delay value within the HRBM message, the transmitting entity 300 may determine whether to respond to the retransmission request when the retransmission request from the receiving entity 250 is received, by comparing the max_end_to_end_delay value or the fixed_end_to_end_delay value with the RTT value rather than comparing an arrival_deadline value with the RTT value. In addition, as in step 437 of FIG. 4, since a case where the RTT value is smaller than the fixed_end_to_end_delay value may mean that the retransmission packet is properly delivered to the receiving entity 250 within a limited time, the transmitting entity 300 retransmits the packet. On the other hand, a case where the RTT value is greater than fixed_end_to_end_delay value may mean that the packet fails to arrive within a limited time. Since a de-jittering buffer of the receiving entity 250 disrupts the received packet, even when the retransmission packet is transmitted, the receiving entity 250 may not receive the same. Therefore, if the RTT value is greater than the fixed_end_to_end_delay value, the transmitting entity 300 may not perform the packet retransmission.

In the second embodiment of the present invention, the transmitting entity should use the RQF message in order to continuously check the latest RTT value. In an MMT communication system, the receiving entity 250 may transmit various pieces of information, such as channel conditions and the like, through an MC message, to the transmitting entity 300, and an information type to be reported may be set in the MC message and the corresponding information may be included in the RQF message. That is, the transmitting entity 300 has to know information related to the latest RTT value in order for the transmitting entity 300 to determine whether to retransmit when the Delay-constrained ARQ is performed. For example, when the receiving entity 250 plans to perform the Delay-constrained ARQ, terms and conditions can be given to measurement_condition ( ) in the MC message, so as to transmit the RQF message to the transmitting entity 300. So far, since there are no terms and conditions allowing the transmission of the RQF message when the Delay-constrained ARQ is performed for the measurement_condition ( ), it is required to add the terms and conditions. For example, when "measurement_condition ( )=0x0001" is designated in the MC message, the receiving entity 250 has to transmit the RQF message such that the receiving entity 250 transmits the Delay-constrained ARQ message and at the same time, the transmitting entity 300 checks information related to the latest RTT value.

Figure 5:
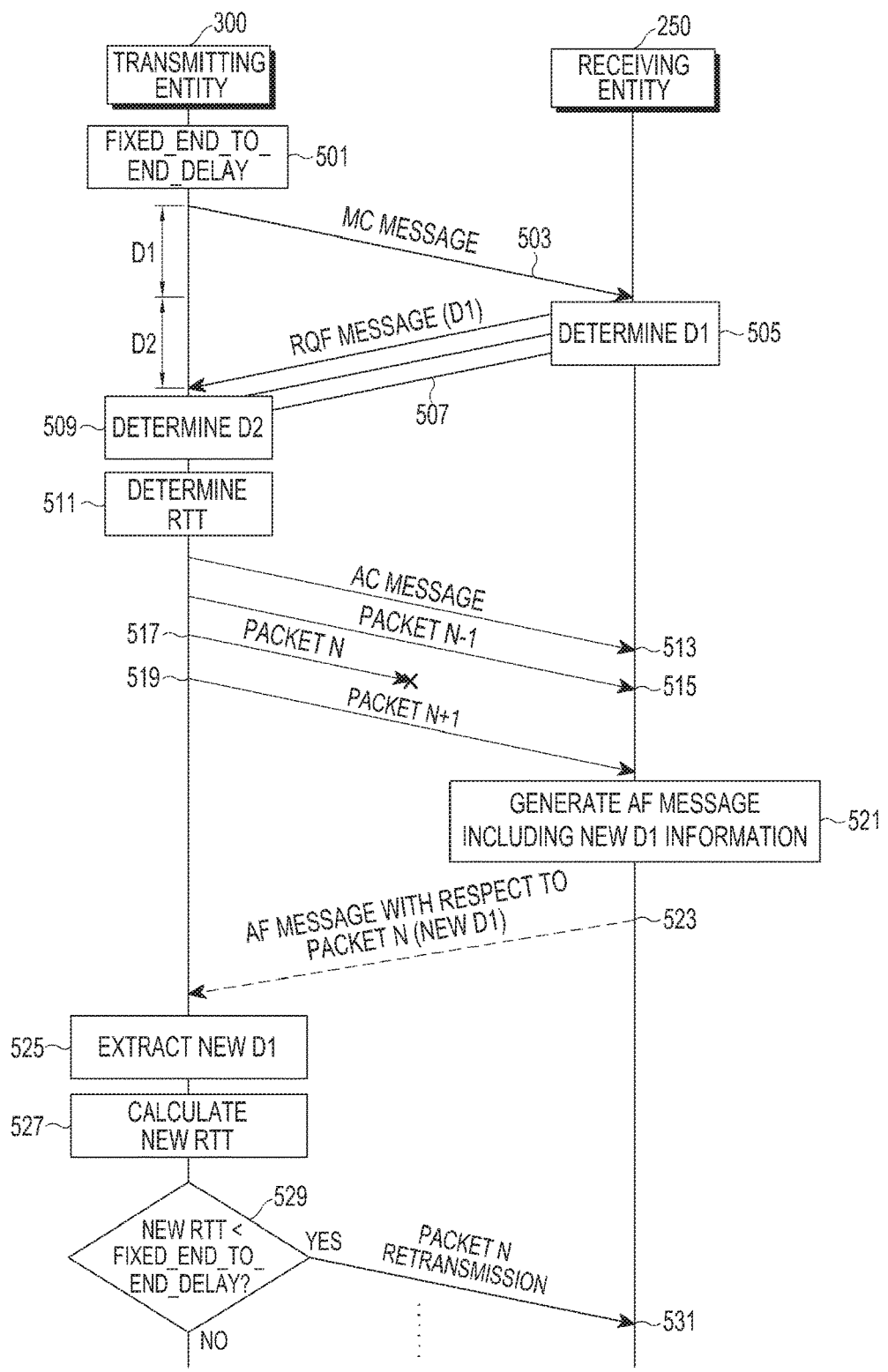
FIG. 5 illustrates a method for transmitting and receiving information in an MMT system according to a third embodiment of the present invention.

FIG. 5 is showing a method of transmitting and receiving information in an MMT system according to a third embodiment of the present invention.

The third embodiment of the present invention relates to a method for transmitting and receiving information in a case of determining whether to request the retransmission for the lost packet, by the transmitting entity 300, and more particularly, to a case where the transmitting entity 300 inserts information related to the measured latest RTT values into the AF message.

Referring to FIG. 5, the transmitting entity 300 checks information related to the fixed_end_to_end_delay value included in the HRBM message (indicated by reference numeral 501). In addition, the transmitting entity 300 transmits the MC message to the receiving entity 250 (indicated by reference numeral 503). The receiving entity 250 may determine a D1 value based on the MC message, and transmit an RQF message including information related to the D1 value to the transmitting entity 300. Then, the transmitting entity 300 determines a D2 value based on the RQF message (indicated by reference numeral 509), and determines an RTT value by using the information related to the D1 value and the D2 value included in the RQF message (indicated by reference numeral 511).

In addition, the receiving entity 250 receives the AC message from the transmitting entity 300 (indicated by reference numeral 513), and confirms that the packet N−1 and packet N+1 are successfully received and the packet N fails to be received (indicated by reference numerals 515 to 519).

Thereafter, the receiving entity 250 transmits, to the transmitting entity 300, the AF message designating a packet type (for example, a packet N) a retransmission request is made for. In addition, during the Delay-constrained ARQ, the transmitting entity 300 has to know information related to the latest RTT value in order to determine whether to retransmit, and to this end, the receiving entity 250 may insert the latest D1 version (that is, information related to a new D1 value), from the transmitting entity 300 to the receiving entity 250, in the AF message and transmit the same. In this case, the receiving entity 250 may update the D1 value using the timestamp value and the like in the packet header of other packets, received from the transmitting entity 300, and attach the updated D1 value in the AF message and transmit the same.

That is, the receiving entity 250 transmits the AF message including information related to the new D1 value to the transmitting entity 300. Accordingly, the transmitting entity 300 according to the third embodiment of the present invention checks information on the new D1 value through the AF message (indicated by reference numeral 525). In addition, the transmitting entity 300 calculates a D2 value using the timestamp value in the packet header including the AF message 527, and sums up the new D1 value and D2 value so as to calculate the latest RTT value (indicated by reference numeral 527). In addition, the transmitting entity 300 compares max_end_to_end_delay value or fixed_end_to_end_delay value in the HRBM value with the RTT value, so as to determine whether to retransmit the packet N (indicated by reference numeral 529). In this case, when an FEC is applied to the packet, the RTT value and the max_end_to_end_delay value may be compared, and if the FEC is not applied to the packet, the RTT value and the fixed_end_to_end_delay value may be compared.

Since a case where the fixed_end_to_end_delay value is greater than the RTT value may mean that the retransmitted packet can be safely received within a limited time when the packet retransmission is performed, the transmitting entity 300 retransmits the requested packet N (indicated by reference numeral 531). On the other hand, since a case where the fixed_end_to_end_delay value is smaller than the RTT value may mean that the retransmitted packet may not safely received within a limited time, even if the packet retransmission is performed, the transmitting entity 300 may not perform the retransmission for the requested packet N.

On the other hand, when the RTT value is equal to the fixed_end_to_end_delay value, the transmitting entity 300 may retransmit or not the requested packet according to an embodiment implemented by the packet retransmission.

Figure 6:
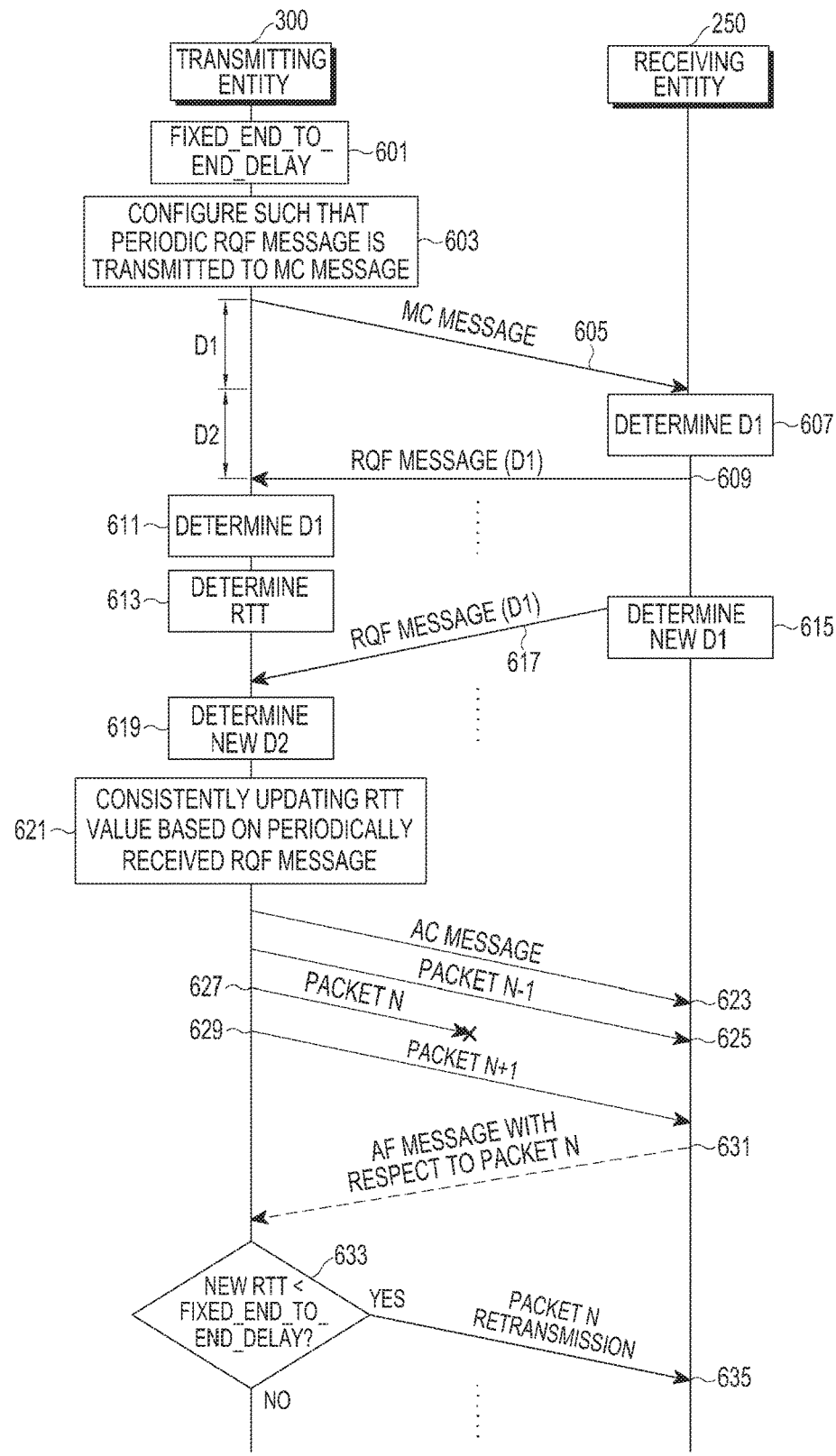
FIG. 6 illustrates a method for transmitting and receiving information in an MMT system according to a fourth embodiment of the present invention.

FIG. 6 illustrates a method for transmitting and receiving information in an MMT system according to a fourth embodiment of the present invention.

The fourth embodiment of the present invention relates to a method for transmitting and receiving information in a case of determining whether to request the retransmission for the lost packet by the transmitting entity 300 and, more particularly, to a case of transmitting periodic RQF messages by the receiving entity 250.

Referring to FIG. 6, the transmitting entity 300 checks information related to the fixed_end_to_end_delay value included in the HRBM message (indicated by reference numeral 601). In addition, the transmitting entity 300 is configured to transmit, into the MC message, the periodic RQF messages in order to collect information related to the latest D1 value (indicated by reference numeral 603), and transmits the configured MC message to the receiving entity 250 (indicated by reference numeral 605). That is, in the fourth embodiment of the present invention, the information related to the latest RTT value has to be checked in order to determine whether to respond to the packet retransmission, by the transmitting entity 300, when the Delay-constrained ARQ is performed. In addition, since the real-time characteristics is important when the transmitting entity 300 is a particular Asset, when it is determined that the Delay-constrained ARQ is necessarily required, the fourth embodiment may allow the receiving entity 250 to periodically transmit the RQF message into the MC message by setting a period value to a measurement_period value.

The receiving entity 250 updates the D1 value using information related to the timestamp value within the packet header of other packets, received from the transmitting entity 300 (indicated by reference numerals 607 and 615), and sets the D1 value to a propagation_delay value in the RQF message and periodically transmits the same to the transmitting entity (indicated by reference numerals 609 and 617). The transmitting entity 300 calculate a D2 value using the timestamp value of the packet header including the RQF message (indicated by reference numerals 611 and 619), and calculates the RTT value by using the D1 value and D2 value (indicated by reference numerals 613 and 621).

In addition, the receiving entity 250 receives the AC message from the transmitting entity 300 (indicated by reference numeral 623), and confirms that the packet N−1 and the packet N+1 are successfully received and the packet N fails to be received (indicated by reference numerals 625 to 629). The receiving entity 250 transmits the AF message requesting the packet N which has not been received to the transmitting entity 300 (indicated by reference numeral 631).

The transmitting entity 300 compares the max_end_to_end_delay value or the fixed_end_to_end_delay value in the HRBM message with the RTT value to determine whether to retransmit the packet N (indicated by reference numeral 633). That is, since a case where the fixed_end_to_end_delay value is greater than the RTT value may mean that the retransmission packet can be safely received within a limited time, the transmitting entity 300 retransmits the requested packet N (indicated by reference numeral 635). On the other hand, since a case where the fixed_end_to_end_delay value is smaller than the RTT value may mean that the retransmitted packet fails to be safely received within a limited time, the retransmitting entity 300 does not perform the retransmission for the requested packet N.

On the other hand, when the RTT value is equal to the fixed_end_to_end_delay value, the transmitting entity 300 may retransmit or not the requested packets according to an embodiment implemented by the packet retransmission.

Figure 7:
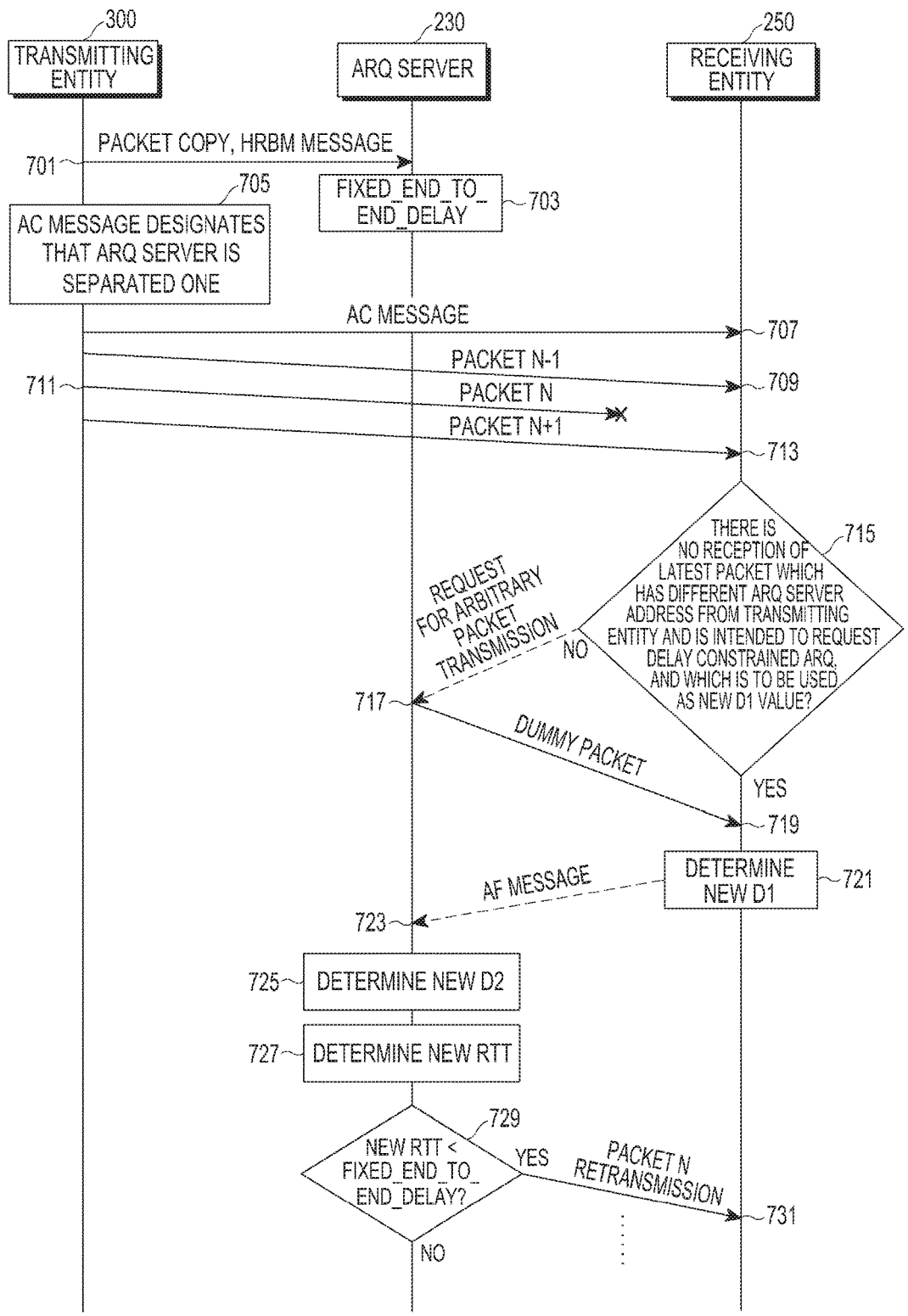
FIG. 7 illustrates a method for transmitting and receiving information in an MMT system according to a fifth embodiment of the present invention.

FIG. 7 illustrates a method of transmitting and receiving information in the MMT system according to a fifth embodiment of the present invention.

The fifth embodiment of the present invention relates to a method for transmitting and receiving information, in a case where a separate ARQ server 230 exists, when the ARQ server 230 determines whether to request for the lost packet retransmission. The ARQ server 230 for the retransmission may exist in a device physically separated from the transmitting entity 210 in the MMT system.

Referring to FIG. 7, the transmitting entity 210 copies the MMT packet to transmit the same to the ARQ server 230, and transmits the HRBM message to the ARQ server 230 (indicated by reference numeral 701). In this case, the HRBM message includes at least one of information related to the max_end_to_end_delay value and information related to the fixed_end_to_end_delay value. In addition, the ARQ server 230 stores at least one of information related to the max_end_to_end_delay value included in the received message HRBM 703 and information related to the fixed_end_to_end_delay value (indicated by reference numeral 703).

The transmitting entity 210 designates that the ARQ server 230 is separately present through the AC message (indicated by reference numeral 705), and transmit the AC message to the receiving entity 250 (indicated by reference numeral 707). Here, the AC message may include information on the address of the separate ARQ server. The address of the separate ARQ server may be designated through arq_server_address as shown in Table 1.

An additional operation is required in order for the server to know and maintain the latest RTT value between the ARQ server and the receiving entity 250. As described in the fifth embodiment of the present invention, when the separate ARQ server 230 is present and the ARQ server 230 determines whether to retransmit, since the ARQ server 230 is in a state of not knowing the transmitting entity 210 which has to be served by itself, the ARQ server 230 may not spontaneously instruct the transmission of the latest RTT value through the MC/RQF message. Thus, the receiving entity 250 confirms that the packet N−1 and packet N+1 are successfully received and the packet N fails to be received (indicated by reference numerals 709 to 713). In addition, when the address of the transmitting entity 210 is different from the address of the ARQ server 230, the Delay Constrained ARQ is to be requested, and the latest packet which can be used as the latest D1 value between the ARQ server 230 and the receiving entity 250 is not received, the receiving entity 250 may request for the transmission of a dummy packet (intended for the D1 measurement so the information type included therein does not matter) to the ARQ server 230 in order to check the latest D1 value (indicated by reference numeral 717). The receiving entity 250 receives a dummy packet from the ARQ server 230 (indicated by reference numeral 719), and determines the new D1 value (indicated by reference numeral 721). The receiving entity 250 transmits the AF message including information related to the new D1 value to the ARQ server 230 (indicated by reference numeral 723). The ARQ server 230 receives the AF message to determine a new D2 value (indicated by reference numeral 725), and determines the new RTT value based on the new D1 value and the new D2 value received through the AF message (indicated by reference numeral 727). Here, although a method for directly determining the new RTT value by the ARQ server 230 has been described, since the ARQ server 230 has known the receiving entity 250 which has requested the Delay Constrained ARQ, the ARQ server 230 may transform the request for RTT reception through the MC message, if necessary. Alternatively, when the transmitting entity 210 notifies of the address of the ARQ server 230 to the receiving entity 250 and the receiving entity 250 confirms that the address of the ARQ server 230 and the address of the transmitting entity 210 are different from, each other, the corresponding ARQ server may perform a registration for the delay constrained ARQ operation through a separate message. In addition, the ARQ server 230 previously measures information related to the RTT value with respect to the registered receiving entities, in preparation for the possibility of delay constrained ARQ operation.

Thereafter, the ARQ server 230 compares the max_end_to_end_delay value or the fixed_end_to_end_delay value in the HRBM message with the RTT value to determine whether to retransmit the packet N (indicated by reference numeral 729). That is, since a case where the fixed_end_to_end_delay value is greater than RTT value may mean that the retransmission packet can be safely received within a limited time, the ARQ server 230 retransmits the requested packet N (indicated by reference numeral 729). On the other hand, since a case where the fixed_end_to_end_delay value is smaller than the RTT value may mean that the retransmitted packet fails to be safely received within a limited time, the ARQ server 230 does not perform the retransmission for the requested packet N.

On the other hand, when the RTT value is equal to the fixed_end_to_end_delay value, the transmitting entity 210 may retransmit or not the requested packet N according to an embodiment implemented by the packet retransmission.

Figure 8:
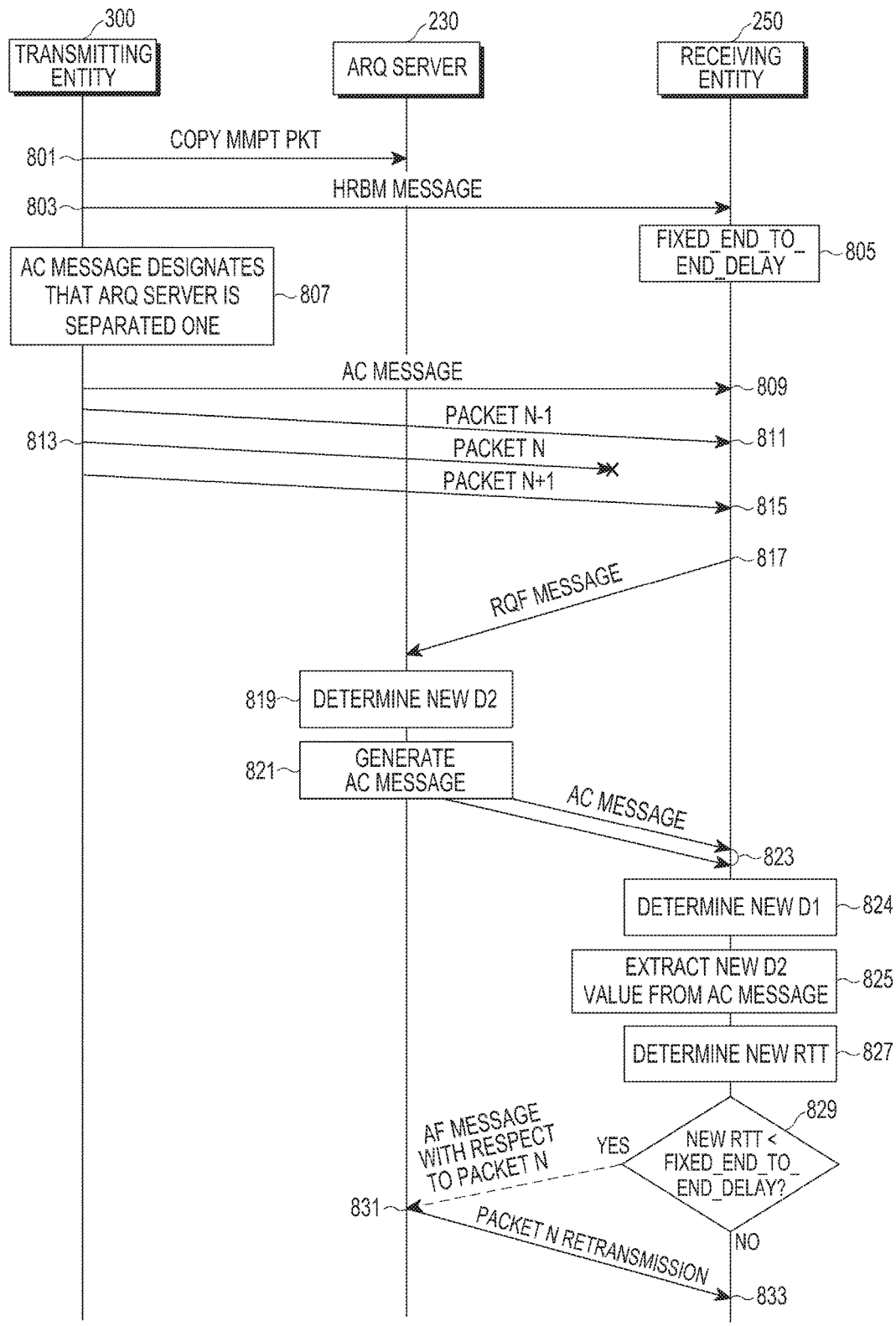
FIG. 8 illustrates a method for transmitting and receiving information in an MMT system according to a sixth embodiment of the present invention.

FIG. 8 illustrates a method for transmitting and receiving information in the MMT system according to a sixth embodiment of the present invention.

The sixth embodiment of the present invention relates to a method for transmitting and receiving information, in a case where a separate ARQ server 230 exists, and the receiving entity 250 determines whether to request for the lost packet retransmission.

In the sixth embodiment of the present invention, when a separate ARQ 230 exists and the receiving entity 250 determines whether to retransmit the packet, as shown in FIG. 8, it operates as follows in order to continuously check the latest RTT value between the ARQ server 230 and the receiving entity 250.

Referring to FIG. 8, the transmitting entity 210 copies the MMT packet to transmit the same to the ARQ server 230, and transmits the HRBM message to the receiving entity 230 (indicated by reference numeral 803). Then, the receiving entity 250 stores the fixed_end_to_end_delay value included in the HRBM message (indicated by reference numeral 805).

The transmitting entity 210 designates, in the AC message, that the ARQ server 230 is separately present (indicated by reference numeral 807), and transmits the AC message to the receiving entity 250 (indicated by reference numeral 809). Here, the AC message may include information on the address of the separate ARQ server. The receiving entity 250 confirms that the packet N−1 and packet N+1 are successfully received and the packet N fails to be received (indicated by reference numerals 811 to 815). In addition, since the receiving entity 250 does not know the RTT value, the receiving entity requests for, through the RQF message, an AC message including AC information, which is control information not a general data packet, in order to know the D2 value (indicated by reference numeral 817). Here, the AF message requesting the AC message may be configured by Table 8 and Table 9 below.

In addition, the ARQ server 230 determines a new D2 value on the basis of the AF message (indicated by reference numeral 819), and generates the AC message including information related to the determined D2 value (indicated by reference numeral 821). Here, the generated AC message includes not only ARQ setting information as shown in the following Table 10 but also information related to the latest D2 value, which is channel information between a specific receiving entity 250, known by the ARQ server 230, and the ARQ server 230. In addition, the receiving entity 250 determines a new D1 value from the AC message (indicated by reference numeral 824), and extracts a new D2 value to determine a new RTT value (indicated by reference numerals 825 and 827).

Accordingly, the receiving entity 250 compares the max_end_to_end_delay value or the fixed_end_to_end_delay value in the HRBM message with the RTT value to determine whether to retransmit the packet N (indicated by reference numeral 829). That is, since a case where the fixed_end_to_end_delay is greater than the RTT value may mean that the retransmission packet can be safely received within a limited time when the packet retransmission is performed, the transmitting entity—250 transmit the AF message requesting the packet N to the ARQ server 230 (indicated by reference numeral 831). Then, the receiving entity 250 may receive the retransmission packet N from the ARQ server 230 (indicated by reference numeral 833). On the other hand, since a case where the fixed_end_to_end_delay value is smaller than the RTT value may mean that the retransmitted packet fails to be safely received within a limited time, the receiving entity 250 does not request the retransmission for the packet N.

On the other hand, when the RTT value is equal to the fixed_end_to_end_delay value, the receiving entity 250 may request or not the packet N according to an embodiment implemented by the packet retransmission.

TABLE 8

| Syntax | Values | No. of bits | Mnemonic |
|---|---|---|---|
| AF_message( ) { | | | |
|   message_id | | 16 | uimsbf |
|   version | | 8 | uimsbf |
|   length | | 16 | uimsbf |
|   message_payload { | | | |
|     arq_type | | 2 | uimsbf |
|     ..... | | | |
|   }/* end of message payload*/ | | | |
| } | | | |

TABLE 9

| Value | Description |
|---|---|
| 00 | AF message with packet_counter is possible. |
| 01 | AF message with packet_id + packet_sequence_number is possible |
| 10 | AF message with delay-constraint argument is possible |
| 11 | AF message requesting AC message including newer channel information or new AC configuration information |

TABLE 10

| Syntax | Values | No. of bits | Mnemonic |
|---|---|---|---|
| AC_message( ) { | | | |
|   message_id | | 16 | |
|   version | | 6 | |
|   length | | 16 | |
|   message_payload{ | | | |
|     flow_label_flag | | 1 | boolean |
|     if(flow_lable_flag == 1) { | | | |
|       fb_flow_label | | 7 | uimsbf |
|     } | | | |
|         number_of_packet_id | | 32 | uimsbf |
|         for(i=0;i<N1;i++){ | | | |
|           packet_id | | 16 | uimsbf |
|           ARQ_support_flag | N1 | 1 | boolean |
|           rtx_window_timeout | | 32 | uimsbf |
|           arq_type | | 2 | uimsbf |
|         } | | | |
|     arq_server_address{ | | | |
|       MMT_general_location_info( ) | | | |
|     } | | | |
|     Channel_information{ | | | |
|       propagation_delay | | | |
|       uplink_delay | | | |
|     } | | | |
|   } | | | |
| } | | | |

On the other hand, another embodiment of the present invention includes configuring a bundle that is a group of Assets having a significant relevance among multiple Assets configuring one package, and collecting ADC information of each Asset to configure BDC information of each bundle in the MMT system. In addition, a server or MANE is to transmit relative priority between bundles and relative priority information between Assets within each bundle. Therefore, the receiving entity may obtain hint information on which one is chosen to stop dummy Asset transmission based on the relative priority between bundles and the relative priority information between Assets within the bundles.

Figure 9:
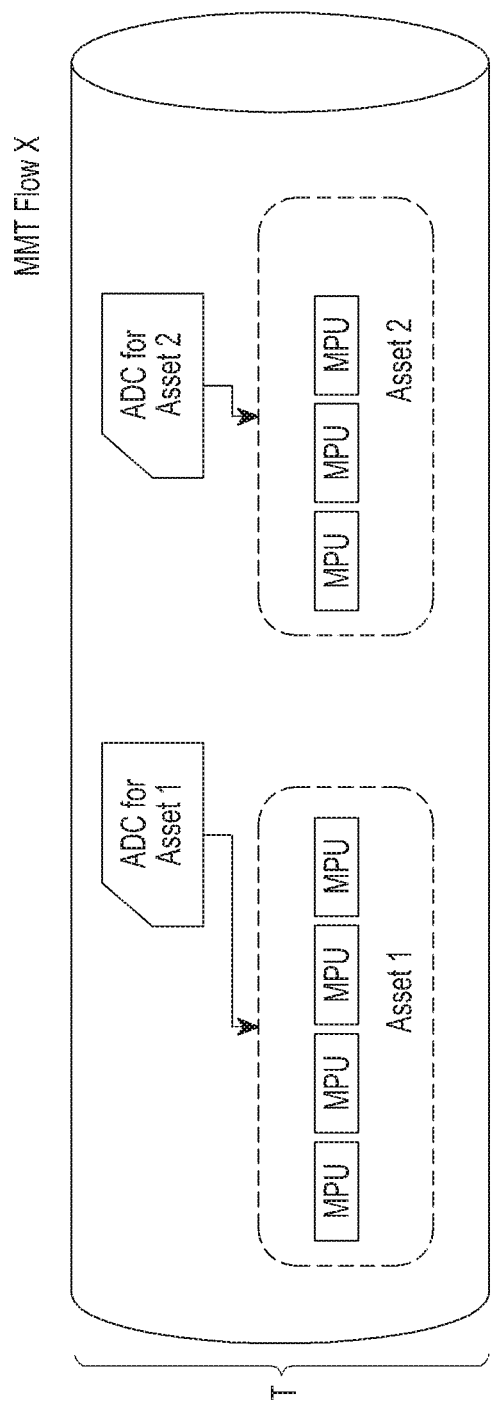
FIG. 9 is a diagram showing the configuration of ADC information in a current MMT standard.

FIG. 9 illustrates the configuration of ADC information in the current MMT standard.

The ADC information is information indicating the transmission characteristics of Asset (ex. Video, Audio, Text, File, etc.) in the MPEG MMT standard, and has the relationship and format (syntax and semantics) as shown in FIG. 9 and Table 11 below. When the ADC information is delivered to the MANE or receiving entity, the MANE may previously obtain a future traffic transmission trend and characteristics information value by using the ADC information so as to obtain a bandwidth saving effect, and since the receiving entity may also know a media arrival rate, there are various advantages of inferring the degree of buffer fulfilment.

TABLE 11

```
<complexType name="AssetDeliveryCharacteristic">
    <sequence>
        <element name="QoS_descriptor"
            type="mmt:QoS_descriptorType" />
```

TABLE 11-continued

```
        <element name="Bitstream_descriptor"
            type="mmt:Bitstream_descriptorType"/>
    </sequence>
</complexType>
<complexType name="QoS_descriptorType">
    <attribute name="loss_tolerance " type="integer"/>
    <attribute name="jitter_sensitivity"type="integer"/>
    <attribute name="class_of_service"type="boolean"/>
    <attribute name="bidirection_indicator"type="boolean"/>
</complexType>
<complexType name="Bitstream_descriptorType">
    <choice>
        <complexType name="Bitstream_descriptorVBRType">
            <attribute name="sustainable_rate"type="float"/>
            <attribute name="buffer_size"type="float"/>
            <attribute name="peak_rate"type="float"/>
            <attribute name="max_MFU_size"type="integer"/>
            <attribute name="mfu_period"type="integer"/>
        </complexType>
        <complexType name="Bitstream_descriptorCBRType">
            <attribute name="peak_rate"type="float"/>
            <attribute name="max_MFU_size"type="integer"/>
            <attribute name="mfu_period"type="integer"/>
        </complexType>
    </choice>
</complexType>
```

In Table 11, each syntax has a meaning (description) shown in Table 12 below.

TABLE 12

| syntax | Description |
|---|---|
| loss_tolerance | indicates required loss tolerance of the Asset for the delivery. The value of loss_tolerance attribute is listed in <table 13>. |
| jitter_sensitivity | indicates required jitter level of underlying delivery network for the Asset delivery between end-to-end. The value of jitter_sensitivity attribute is listed in <table 14>. |

TABLE 12-continued

| syntax | Description |
| --- | --- |
| class_of_service | classifies the services in different classes and manage each type of bitstream with a particular way For example, MANE can manage each type of bitstream with a particular way. This field indicates the type of bitstream attribute as listed in <table 15>. |
| Bidirection_indicator | If set to '1', bidirectional delivery is required. If set to '0', bidirectional delivery is not required. |
| Bitstream_descriptorVBRType | when class_of_service is '1', "Bitstream_descriptorVBRType" shall be used for "Bitstream_descriptorType". |
| Bitstream_descriptorCBRType | when class of service is '0', "Bitstream_descriptorCBRType" shall be used for "Bitstream_descriptorType". |
| sustainable_rate | defines the minimum bitrate that shall be guaranteed for continuous delivery of the Asset. The sustainable_rate corresponds to drain rate in token bucket model. The sustainable_rate is expressed in bytes per second. |
| buffer_size | defines the maximum buffer size for delivery of the Asset. The buffer absorbs excess instantaneous bitrate higher than the sustainable_rate and the buffer_size shall be large enough to avoid overflow. The buffer_size corresponds to bucket depth in token bucket model. Buffer_size of a CBR (constant bit rate) Asset shall be zero The buffer_size is expressed in bytes. |
| peak_rate | defines peak bitrate during continuous delivery of the Asset. The peak_rate is the highest bitrate during every MFU_period. The peak_rate is expressed in bytes per second. |
| MFU_period | defines period of MFUs during continuous delivery of the Asset. The MFU_period measured as the time interval of sending time between the first byte of two consecutive MFUs. The MFU_period is expressed in millisecond. max_MFU_size - indicates the maximum size of MFU, which is MFU_period*peak_rate. The max_MFU_size is expressed in byte. |

In Table 12, values for the loss_tolerance attributes may be indicated by Table 13 below.

TABLE 13

| Value | Description |
| --- | --- |
| 0 | This Assets requires lossless delvery |
| 1 | This Asset allows lossy delivery |

In Table 12 above, values for the class_of_service attributes may be indicated by Table 14 below.

TABLE 14

| Value | Description |
| --- | --- |
| 0 | This Asset requires the preserve time variation between MMT protocol packets |
| 1 | This Asset doesn't require the preserve time variation between MMT protocol packets. |

Values of class_of_service attributes in the Table 12 above may be indicated by Table 15 below.

TABLE 15

| Value | Description |
| --- | --- |
| 0 | The Constant Bit Rate (BR) service class shall guarantee peak bitrate at any time to be dedicated for transmission of the Asset. This class is appropriate for realtime services which require fixed bitrate such as VoIP without silence suppression. |
| 1 | The Variable Bit Rate (VBR) service class shall guarantee sustainable bitrate and allow peak bitrate for the Asset with delay constraints over shared channel. This class is appropriate for most realtime services such as video telephony, videoconferencing, streaming service, etc. |

Figure 10:
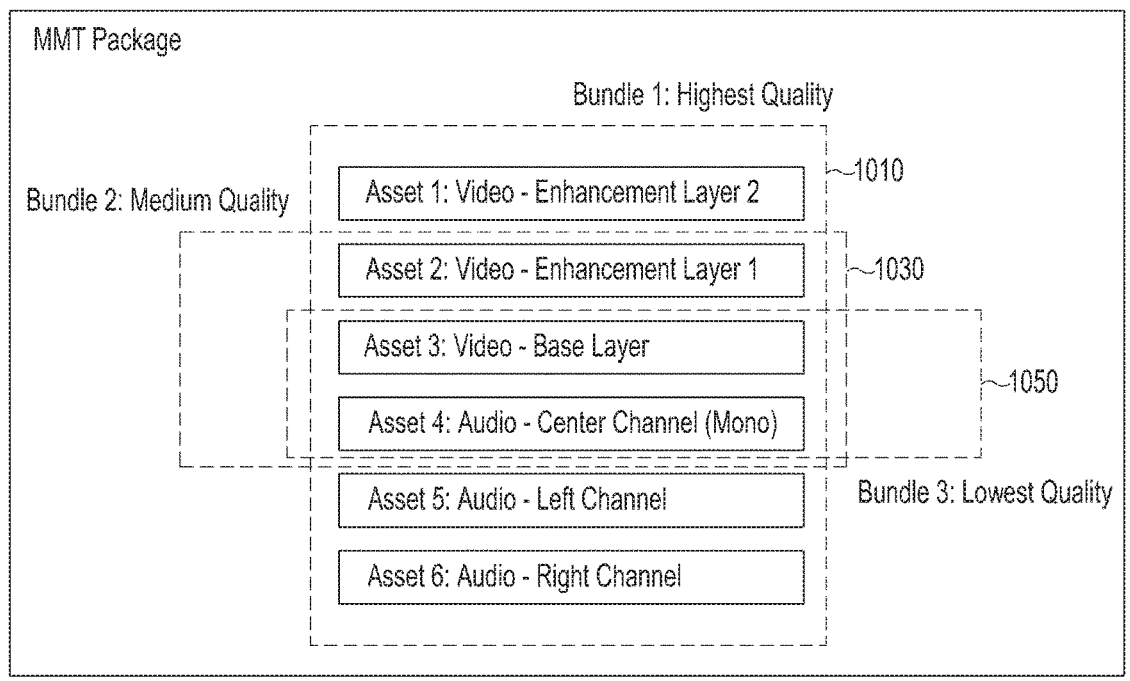
FIG. 10 is a diagram showing the configuration of BDC information according to another embodiment of the present invention.

FIG. 10 illustrates the configuration of BDC according to another embodiment of the present invention.

Referring to FIG. 10, an MMT content is assumed to be configured by a scalable video (SVC) content including a base layer (Asset 3), an enhancement layer 1 (Asset 2), and an enhancement layer 2 (Asset 1), and an audio content including mono (Asset 4), a left channel (Asset 5), and a right channel (Asset 6).

The transmitting entity may transmit various combinations of Assets to the receiving entity in consideration of the user's preferences, network conditions, terminal capabilities, and the like.

Here, the transmitting entity sets the priority to the combination of Assets, and selects the priority according to the user's preferences, network conditions, terminal capabilities, and the like, and then transmits the bundle corresponding to the selected priority to the receiving entity.

For example, as shown in FIG. 10, the MMT Package may include Bundle 1 including Asset 1 to Asset 6, which has the first priority, Bundle 2 including Asset 2 to Asset 4, which has the second first priority, and Bundle 3 including Asset 3 and Asset 4, which has the third priority.

The transmitting entity may transmit the Bundle 1 including all of the Asset 1 to Asset 6 to the receiving entity, in a case of transmitting a content having the highest quality. In addition, the transmitting entity may transmit the Bundle 3 to the receiving entity when the network condition is not good and the user is not a premium user.

As described above, one MMT content typically includes multiple Assets, and a collection of the series of Assets is selected in order to play the MMT content at a predetermined time. Here, if the transmission characteristics can be properly described as the Bundle unit, which is a bundle of significant Assets not an individual Asset unit, simpler and more effective information can be provided to a network node or the receiving entity 250. Thus, an embodiment of the present invention introduces a concept of the Bundle, and defines Syntax and Semantics for describing the BDC information which is the transmission characteristics information of the bundle in Table 16 below.

Table 16 indicates an example of Syntax for the BDC information.

TABLE 16

```
<?xml version="1.0" encoding="UTF-8"?>
<xs:schema xmlns:xs="http://www.w3.org/2001/XMLSchema"targetNamespace="mmt">
    <xs:element name="BundleDeliveryCharacteristic" type="mmt:BundleDeliveryCharacteristicType">
        <xs:attribute name="MMT_package_id" type="xs:string"/>
    </xs:element>
    <xs:complexType name="mmt:BundleDeliveryCharacteristicType">
        <xs:sequence>
            <xs:element name="Bundle" type="mmt:BundleType"
minOccurs="1" maxOccurs="unbounded"/>
        </xs:sequence>
    </xs:complexType>
    <xs:complexType name="mmt:BundleType">
        <xs:sequence>
            <xs:element name="Element_Asset_id" type="asset_id_T" minOccurs="1">
                <xs:attribute name="Intra_Bundle_Priority" type="xs:integer"/>
            </xs:element>
        </xs:sequence>
    </xs:element name="Bundle_QoS_descriptor" type="mmt:QoS_descriptorType"/>
    </xs:element name="Bundle_Bitstream_descriptor" type="mmt:Bitstream_descriptorType"/>
    </xs:attribute name="Bundle_id" type="xs:integer"/>
    </xs:attribute name="Inter_Bundle_Priority" type="xs:integer"/>
    </xs:complexType>
    <xs:complexType name="mmt:QoS_descriptorType">
        <xs:attribute name="loss_tolerance" type="xs:integer"/>
        <xs:attribute name="jitter_sensitivity" type="xs:integer"/>
        <xs:attribute name="class_of_service" type="xs:boolean"/>
        <xs:attribute name="distortion_levels" type="xs:integer"/>
        <xs:attribute name="bidrection_indicator" type="xs:boolean"/>
    </xs:complexType>
    <xs:complexType name="Bitstream_descriptorType">
        <xs:choice>
            <xs:complexType name="Bitstream_descriptorVBRType">
                <xs:attribute name="sustainable_rate" type="xs:float"/>
                <xs:attribute name="buffer_size" type="xs:float"/>
                <xs:attribute name="peak_rate" type="xs:float"/>
                <xs:attribute name="max_MFU_size" type="xs:integer"/>
                <xs:attribute name="mfu_period" type="xs:integer"/>
            </xs:complexType>
            <xs:complexType name="Bitstream_descriptorCBRType">
                <xs:attribute name="peak_rate" type="xs:float"/>
                <xs:attribute name="max_MFU_size" type="xs:integer"/>
                <xs:attribute name="mfu_period" type="xs:integer"/>
            </xs:complexType>
        </xs:choice>
    </xs:complexType>
</xs:schema>
</xml>
```

In Table 16, MMT_package_id may mean an ID of the corresponding package, which indicates that various pieces of information provided by the current BDC information correspond to bundles in what kind of package type. One package may include multiple Assets, and may include multiple bundles depending on the combination of Assets. Here, the BDC information may be generated by the transmitting end itself, by viewing the ADC information, and may be provided by a package provider.

Element_Asset_id is an Asset ID configuring the current BDC information, and the BDC information puts the ID list information of Assets configuring the corresponding bundle in each bundle, which indicates what kinds of Assets are included in the current bundle.

Bundle_id is an identifier for dividing bundles within one package.

Intra_Bundle_Priority is an attribute value indicating priorities for which Assets configuring the current BDC information have within the corresponding bundles. The Intra_Bundle_Priority indicates the priority between Assets considered important by a content provider (author), which is indicated by a service provider or package provider who creates a package or bundle, and is a means for delivering the intent of the content provider to the transmitting entity, MANE, or receiving entity. Accordingly, when the transmitting entity or MANE stops or subtracts arbitrary Asset transmission due to network congestion and user preferences, a drop in the MMTP packet unit is possible, but the priority among Assets within bundles may be determined based on Intra_Bundle_Priority and a specific Asset itself may be dropped in the transmission depending on the importance. Although various method are possible to represent the priority, the priority can be designated by an arbitrary sequence defined by the content provider himself (ex. zero is the highest priority and 12 is the lowest priority, and so on).

Inter_Bundle_Priority is an attribute value indicating the relative priorities of multiple bundles existing in the current package. The Inter_Bundle_Priority indicates the priority between the bundles being considered important by a content provider (author), which is indicated by a service provider or a package provider for generating the package or bundle, and a means for delivering the intent of the content provider to the transmitting entity, MANE, or receiving entity. Accordingly, when the transmitting entity or MANE stops arbitrary bundle transmission or changes to another bundle transmission due to network congestion and user preferences, it is possible to determine the priority among the bundles based on Inter_Bundle_Priority and to transmit the specific bundle according to the importance and change the bundle to another bundle. Although various methods are possible to represent the priority, the priority can be designated by an arbitrary sequence defined by the content provider himself (ex. zero is the highest priority and 12 is the lowest priority, and so on).

Syntax other than the syntax described above has a meaning (description) shown in Table 17 below.

TABLE 17

| syntax | Description |
| --- | --- |
| loss_tolerance | indicates required loss tolerance of the Bundle for the delivery. The value of loss_tolerance attribute is listed in <table 18>. |
| jitter_sensitivity | indicates required jitter level of underlying delivery network for the Bundle delivery between end-to-end. The value of jitter_sensitivity attribute is listed in <table 19>. |
| class_of_service | classifies the services in different classes and manage each type of bitstream with a particular way. For example, MANE can manage each type of bitstream with a particular way. This field indicates the type of bitstream attribute as listed in <table 20>. |
| Bidirection_indicator | If set to '1', bidirectional delivery is required. If set to '0', bidirectional delivery is not required. |
| Bitstream_descriptorVBRType | when class_of_service is '1', "Bitstream_descriptorVBRType" shall be used for "Bitstream_descriptorType" |
| Bitsteram_descriptorCBRType | when class_of_service is '0', "Bitstream_descriptorCBRType" shall be used for "Bitstream_descriptorType". |
| sustainable_rate | defines the minimum bitrate that shall be guaranteed for continuous delivery of the Bundle. The sustainable_rate corresponds to drain rate in token bucket model. The sustainable_rate is expressed in bytes per second. |
| buffer_size | defines the maximum buffer size for delivery of the Bundle. The buffer absorbs excess instantaneous bitrate higher than the sustainable_rate and the buffer_size shall be large enough to avoid overflow. The buffer_size corresponds to bucket depth in token bucket model. Buffer_size of a CBR (constant bit rate) Bundle shall be zero. The buffer_size is expressed in bytes |
| peak_rate | defines peak bitrate during continuous delivery of the Bundle. The peak_rate is the highest bitrate during every MFU_period. The peak_rate is expressed in bytes per second. |
| MFU_period | defines period of MFUs during continuous delivery of the Bundle. The MFU_period measured as the time interval of sending time between the first byte of two consecutive MFUs. The MFU_period is expressed in millisecond. |
| max_MFU_size | indicates the maximum size of MFU, which is MFU_period*peak_rate. The max_MFU_size is expressed in byte. |
| MMT_package_id | this field is a unique identifier of the Package. This BDC describes delivery characteristics of all the possible Bundles within the scope of this package. |
| Element_Asset_id | identifier of asset which is an element of current bundle. |
| Bundle_id | identifier of bundle which distinguish bundles within the package. |
| Intra_Bundle_Priority | defines the relative priority level among assets within a bundle, which ranges from 0(highest) to 12(lowest). |
| Inter_Bundle_Priority | defines the relative priority level among bundles, which ranges from 0(highest) to 12(lowest). |

In Table 17 above, the value of loss_tolerance attributes may be shown in Table 18 below, the value of jitter_sensitivity attributes may be shown in Table 19 below, in a class_of_service field, the type of bit stream attributes may be shown in Table 20 below.

TABLE 18

| Value | Description |
| --- | --- |
| 0 | This Bundle requires lossless delivery |
| 1 | This Bundle allows lossy delivery |

TABLE 19

| Value | Description |
| --- | --- |
| 0 | This Bundle requires the preserve time variation between MMT protocol packets. |
| 1 | This Bundle doesn't require the preserve time variation between MMT protocol packets. |

TABLE 20

| Value | Description |
| --- | --- |
| 0 | The Constant Bit Rate (CBR) service class shall guarantee peak bitrate at any time to be dedicated for transmission of the Bundle. This class is appropriate for realtime services which require fixed bitrate such as VoIP without silence suppression. |
| 1 | The Variable Bit Rate (VBR) service class shall guarantee sustainable bitrate and allow peak bitrate for the Bundle with delay constraints over shared channel. This class is appropriate for most realtime services such as video telephony, videoconferencing, streaming service, etc. |

Figure 11:
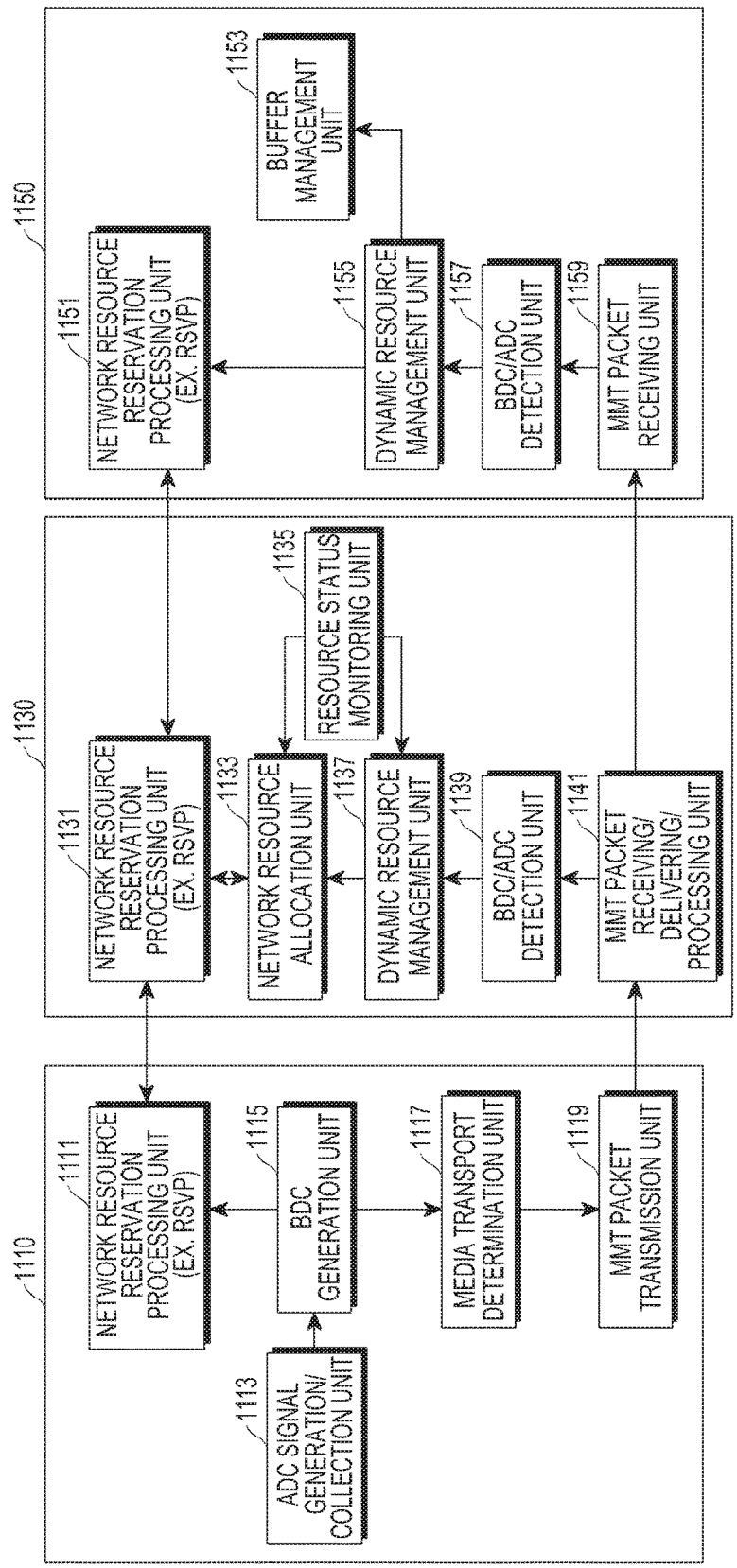
FIG. 11 is a diagram showing the configuration of each node in an MMT system according to another embodiment of the present invention.

FIG. 11 illustrates the configuration of each node in the MMT system according to another embodiment of the present invention.

Referring to FIG. 11, the system includes a transmitting entity 1110 which is an MMT packet transmission node, a receiving entity 1150 which is an MMT packet reception node, and a MANE 1130 which is a network node, such as a router switch.

An ADC signal generation and collection unit 1113 included in the transmitting entity 1110 is a module for collecting ADC information including media (that is, Asset) traffic attribute information with time, and properly processing the same so as to be used by the transmitting entity 1110 or to be transmitted to the receiving entity 1150. The BDC generation unit 1115 is a module for generating BDC information which is transmission characteristics information for a specific bundle from ADC information of each Asset configuring a specific bundle. A media transport determination unit 1117 determines whether to change the quality of the media data being transmitted according to the user preferences, network congestion, and device capabilities. In addition, when the quality of the media data being transmitted is required to be changed, the media transport determining unit 1117 changes the bundle being transmitted to a bundle having different quality or performs an operation of stopping the transmission of particular Assets in a particular bundle, in consideration of at least one of priority information between bundles (Inter_Bundle_Priority) and priority information (Intra_Bundle_Priority) between Assets in the bundle based on the BDC information. In other words, the media transport determination unit 1117 is a module for determining an Asset to be transmitted so as to enable adaptive transmission with respect to the media data. A network resource reservation processing unit 1111 is a module for processing a protocol (ex. RSVP) for reserving network resources in order to transmit MMT traffic using a separate MMT protocol that is not defined by the MMT. In addition, an MMT packet transmitting unit 1117 is a module for receiving the MMT packet and delivering the same to an ADC detection unit 1157 or is a module for directly transmitting the MMT packet to a receiving entity 1150.

A BDC/ADC detection unit 1139 included in the MANE 1130 is a module for monitoring MMT packets passing through the MANE 1130 and extracting a signaling message including BDC/ADC information from the monitored MMT packets. For example, the MANE 1130 may determine whether the corresponding message includes the BDC/ADC information on the basis of the Type field of the MMT packet header and message_id information in the message. In addition, the BDC/ADC detection unit 1139 is a module for detecting whether the update of the BDC/ADC information is required, and requesting for BDC/ADC information desired to know to the transmitting entity 1110, if required.

An MMT packet receiving/delivering/processing unit 1141 is a module for receiving the MMT packet from the transmitting entity 1110, and delivers the same to the receiving entity 1150. In addition, the MMT packet receiving/delivering/processing unit 1141 already has known the BDC information, and is a module for, if forced packet dropping is required due to situations such as network congestion, performing, by the MANE, dropping of a specific packet or a specific Asset based on the BDC information.

A dynamic resource management unit 1137 is a module for receiving the BDC/ADC information from the transmitting entity 1110, and applying the same to efficiently update the network resource request in consideration of its traffic characteristics, and a dynamic resource management unit in the receiving entity 1150 may use the same as a reference material when an RSVP with the transmitting entity 1110 is performed (as an example, updates, and level etc.). In addition, it may be utilized in buffer information to be fulfilled by the receiving entity 1150 through the BDC/ADC information.

A network resource reservation processing unit 1131 is a separate protocol, which is not defined by the MMT, and is a module for processing a protocol (for example, RSVP) for the reservation of network resources for the MMT traffic transmission.

A network resource allocating unit 1133 is a module for allocating network resources (as an example, a router) to specific traffic. In addition, a resource status monitoring unit 1135 is a module for figuring out the resource usage situation of the MANE 1130 currently being used.

A dynamic resource management unit 1155 included in the receiving entity 1150 is a module for receiving ADC information from the receiving entity 1110 and applying the same to effectively update the network resource request in consideration of its traffic characteristics, and the receiving entity 1150 may use the same as a reference material when an RSVP with the transmitting entity 1110 is performed (ex. updates, and level etc.). In addition, buffer information and the like may be utilized to satisfy the receiving entity 1150 through the BDC/ADC information.

A BDC/ADC detection unit 1157 is a module for monitoring the received MMT packets and extracting signaling messages therefrom including BDC/ADC information, and may determine whether the corresponding message includes the BDC/ADC information on the basis of the Type field of the MMT packet header and the message_id information within the message.

A network resource reservation processing unit 1151 is a separate protocol, which is not defined by the MMT, and is a module for processing a protocol (ex. RSVP) for reservation of network resources for MMT traffic transmission. In addition, an MMT packet receiving unit 1159 is a module for receiving the MMT packet from the transmitting entity 1110 and processing the same.

On the other hand, FIG. 11 illustrates detailed units included in each of the transmitting entity 1110, the MANE 1130, and the receiving entity 1150, and at least two of the detailed units may also be illustrated in an integrated form. In addition, detailed units illustrated in each device may be implemented in a single processor.

Hereinafter, in another embodiment of the present invention, a method of generating BDC information and using the generated BDC information will be described.

First, in another embodiment of the present invention, the BDC information is generated as follows.

BDC information of a specific bundle may be created by collecting respective parameter values of ADC information which is the transmission characteristics of all Assets belonging to the corresponding bundle. For example, for a bundle consisting of three Assets, the transmission characteristics value of the bundle (QoS descriptors and bit stream descriptors) may be generated using the ADC value of each of the Assets by using the following rules.

1. [sustainable_rate, buffer_size]: a Leaky bucket model can be represented as a sustainable rate R and buffer_size B and its values can be calculated under Equation 1 and Equation 2 as follows.

When one bundle consists of three Assets, each parameter value of the bundle may be derived using the parameter value of each of the Assets in the following method. Sustainable_rate of the bundle may be represented by the arithmetic sum of sustainable_rate of each of the Assets in the following Equation 1, and the size of the buffer required for one bundle may be represented by the Equation 2.

$$R_{BDC} = R_1 + R_2 + R_3 \quad \text{Equation 1}$$

$$B_{BDC} = \sqrt{B_1^2 + B_2^2 + B_3^2} \quad \text{Equation 2}$$

2. [peak_rate, max_MFU_size, mfu_period]: $Pk_{BDC}$, which is a Peak_rate of a bundle, $MMF_{BDC}$, which is a max_MFU_size of the bundle, and $MFU\_P_{BDC}$, which is a MFU_Period value of the bundle are regarded as statistical standard deviation values, and can be obtained by the mean square value of the corresponding values of each piece of ADC information in Equation 3 as follows.

$$Pk_{BDC} = \sqrt{Pk_1^2 + Pk_2^2 + Pk_3^2}$$

$$MMF_{BDC} = \sqrt{MMF_1^2 + MMF_2^2 + MMF_3^2}$$

$$MFU\_P_{BDC} = \sqrt{MFU\_P_1^2 + MFU\_P_2^2 + MFU\_P_3^2} \qquad \text{Equation 3}$$

3. [Transmission_priority, Pr] can be calculated using Equation 4 as follows. The transmission priority of a bundle is determined based on the Asset having highest priority among priorities of Assets constituting the bundle can be determined.

$$Pr_{BDC} = \max(Pr_1, Pr_2, Pr_3) \qquad \text{Equation 4}$$

4. [Delay_priority Dp] can be calculated by using Equation 5 below. A delay priority of a bundle may be determined based on the Asset having lowest priority among delay priorities of Assets constituting the bundle.

$$DP_{BDC} = \min(D_{P1}, D_{P2}, D_{P3}) \qquad \text{Equation 5}$$

5. [Class_of_service CS] can be calculated by using Equation 6 below. At this time, when one of a CS is VBR, the bundle is VBR. In addition, in Equation 6 below, ∥ refers to an OR operation.

Equation 6

$$CS_{BDC} = (CS_1 \| CS_2 \| CS_3) \qquad \text{Equation 6}$$

6. [Bidirectional_indicator, BI] can be calculated by using Equation 7 below. At this time, if one of BI is bidirectional, the bundle has bi-directional 0.

Equation 7

$$BI_{BDC} = (BI_1 \| BI_2 \| BI_3) \qquad \text{Equation 7}$$

Figure 12:
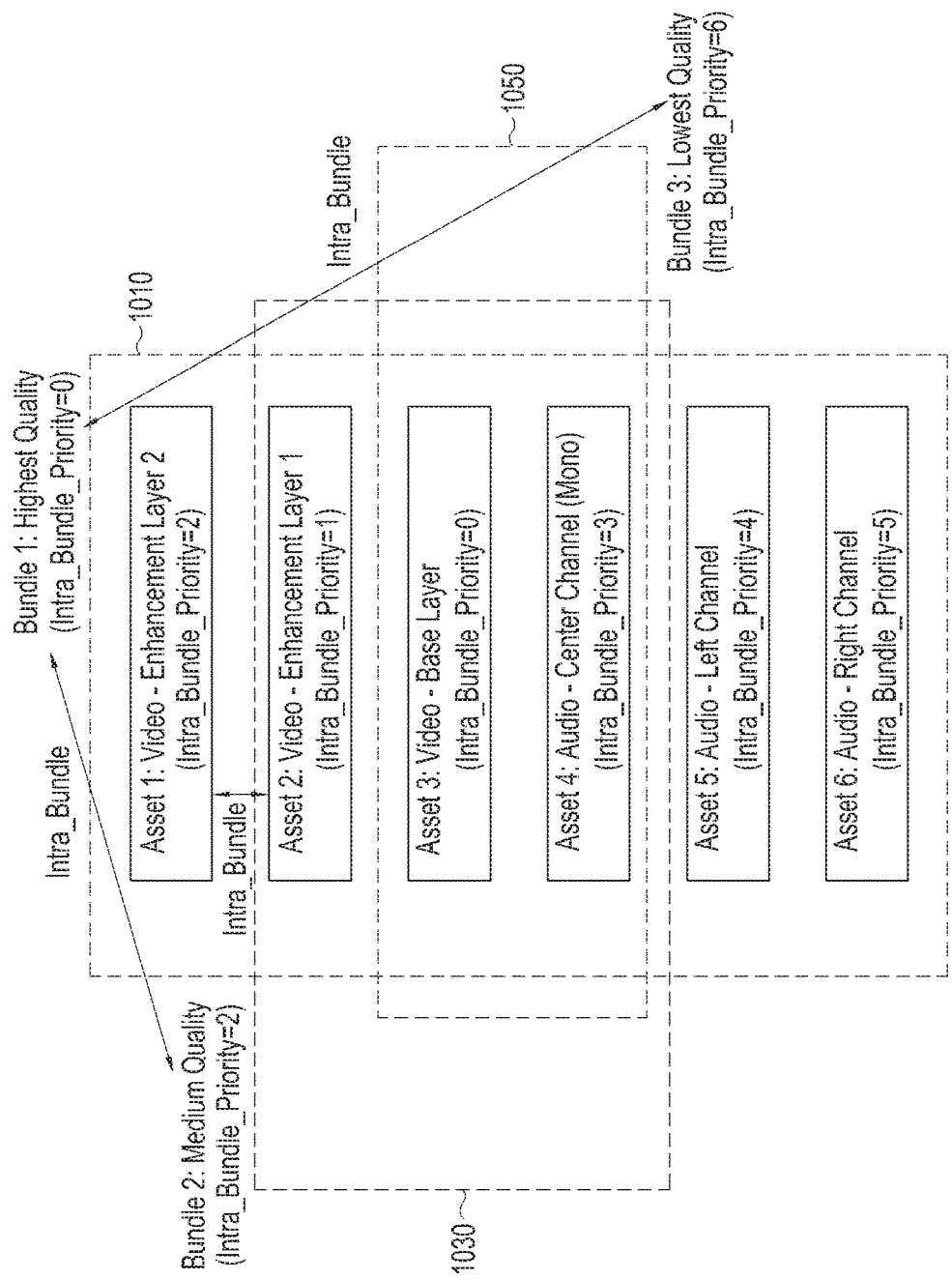
FIG. 12 is a diagram illustrating a method for transmitting BDC information from a transmitting entity according to another embodiment of the present invention.

FIG. 12 illustrates a method of transmitting BDC information by a transmitting entity according to another embodiment of the present invention.

Referring to FIG. 12, the transmitting entity may perform effective packet dropping when relevant information for the related media (Assets) is applied to the corresponding nodes in consideration of a user preference, network congestion situation, device capabilities and the like. In addition, the transmitting entity has to change the quality of the media data being transmitted according to the change of the user preferences, network congestion situation, and device capabilities (i.e., high-quality media data→low-quality media data, the low-quality media data→high-quality media data), however, when media transport is required, which is adaptive to situation, such as the server/MANE/receiving entity 250 and the like stops the transmission of some Assets, the bundle information according to an embodiment of the present invention can be used.

For example, when the necessity for providing an adaptive quality to media data being provided is detected based on the current network congestion situation, the transmitting entity checks at least one of priority information between bundles included in the BDC information (Inter_Bundle_Priority) and priority information between Assets in the bundle (Intra_Bundle_Priority). In addition, the transmitting entity performs operations of, based on the at least one of the checked Inter_Bundle_Priority and Intra_Bundle_Priority, changing the bundle being transmitted to a bundle having a different quality, or stopping the transmission of particular Assets within a particular bundle. Accordingly, the receiving entity may receive a bundle according to the current network congestion situation and provide optimum media data according to the current situation.

When the MMT adaptive transmission is required in a network congestion situation, the transmitting entity in a conventional MMT system has performed adaptive transmission in a way of removing a particular frame. In this case, the transmitting entity performs the adaptive transmission by way of uniformly dropping a particular frame to all Assets. However, according to an embodiment of the present invention, the transmitting entity may selectively transmit a particular Asset or may not transmit all of them. For example, when network congestion is generated in N-screen broadcasting, the transmitting entity changes the bundle itself to a bundle having a specific low rate, or may not transmit Assets having low importance and to be transmitted to a second screen among multiple Assets in the corresponding bundle, rather than simultaneously reducing, through packet dropping, all of the video frame data transmitting to the main TV and the second screen.

In Table 6 above, the Inter_Bundle_Priority value is an attribute value indicating a relative priority between multiple bundles exists in the current package. In particular, the Inter_Bundle_Priority value is a priority between bundles considered to be important by a content provider, which is indicated by a service provider or package provider who creates a package or bundle, and is a means for transmitting the intentions of the content provider to the transmitting entity, the MANE, or the receiving entity. Through which, when arbitrary bundled transmission is stopped or is changed to another bundle transmission due to the network congestion and user preferences, the transmitting entity or MANE may determine the priority between bundles based on the Inter_Bundle_Priority value, and transmit a specific bundle based on the importance and also changes to another bundle and transmit the same. Although various methods for representing the priority are possible, an arbitrary order defined by the content provider himself/herself can be used (ex. zero is the highest priority and 12 is the lowest priority, and so on).

In Table 16, the Intra_Bundle_Priority value is an attribute value indicating a priority which Assets configuring the current BDC information have in the corresponding bundle. The Intra_Bundle_Priority value is a priority between Assets to be considered important by a content provider, which is indicated by a Service Provider or a Package Provider who creates a bundle or package, and is a means for transmitting the intentions of the content provider to the transmitting entity, MANE, or the receiving entity. Though which, when the transmitting entity or MANE has to stop and delete the transmission of an arbitrary Asset according to network congestion, user preferences or the like, drop in the MMTP packet unit may possible, and the transmitting entity or MANE may determine a priority between Assets within a bundle based on the Intra_Bundle_Priority value, and may drop the specific Asset itself in the transmission according to the importance. Although various methods for representing the priority are possible, an arbitrary order defined by the content provider himself/herself can be used (ex. zero is the highest priority and 12 is the lowest priority, and so on).

On the other hand, an MMT flow, which is transmitted from one transmitting entity to another receiving entity, is configured to a single bundle, and the transmission characteristics of the corresponding bundle may be known through the BDC information. At this time, the MANE uses an identifier, referred to as flow_label, in the MMT specification in order to manage per-flow QoS of a particular flow. The flow_label may be defined as follows:

flow_label (7 bits)—an identifier for dividing the flow, and which may be used when an application is temporarily reserved network resources during a session. One flow is defined as one or a plurality of bit streams requiring reservation of network resources using ADC information in the package. An arbitrary division number between zero to 127 may be assigned to one session to which network resources or decoder resources are allocated.

Therefore, in the transmitting entity according to an embodiment of the present invention, when multiple Assets are transmitted within one flow, a particular flow_label may be represented as BDC information, and may be used for resource reservation.

Although the embodiment has been described in the detailed description of the present invention, the present invention may be modified in various forms without departing from the scope of the present invention. Thus, the scope of the present invention shall not be determined merely based on the described exemplary embodiments and rather determined based on the accompanying claims and the equivalents thereto.

The invention claimed is:

1. A method for transmitting, by a transmitting entity, one or more packets in a system, the method comprising:
    generating automatic repeat request (ARQ) configuration information including information on a time window during which the transmitting entity stores transmitted packets for retransmission;
    transmitting an ARQ configuration (AC) message including the ARQ configuration information;
    receiving an ARQ feedback (AF) message including information on a lost packet among the one or more packets, information on a mode of ARQ and information on an argument type used when a receiving entity requests the lost packet;
    determining whether to retransmit the lost packet based on the AF message; and
    retransmitting the lost packet based on the determination,
    wherein the information on the argument type includes one of a value indicating that the receiving entity send the AF message with a packet counter information and a value indicating that the receiving entity send the AF message with a packet id information and a packet sequence number information.

2. The method of claim 1,
    wherein the AC message includes information on an address of a server where to request the lost packet, and
    wherein the AF message includes information on a number of packet id that has lost packets.

3. The method of claim 1, wherein the AF message includes a mask field where each bit of the mask field corresponds to each of the one or more packets for reporting a packet loss.

4. The method of claim 1, wherein the information on the mode of ARQ comprises at least one of:
    a value indicating that a server transmits the lost packet without considering a delay constraint,
    a value indicating that a receiving entity sends the AF message with a ARQ feedback timestamp field and an arrival deadline field, or
    a value indicating that the receiving entity sends the AF message with a propagation delay field.

5. The method of claim 4,
    wherein the ARQ feedback timestamp field indicates a time at which the AF message is sent from the receiving entity, and
    wherein the arrival deadline field indicates a deadline by which a retransmitted packet for a first lost packet arrives at the receiving entity.

6. The method of claim 1,
    wherein the AF message includes a flag indicating a present time of an arrival deadline field, and
    wherein the arrival deadline field indicates a deadline by which a retransmitted packet for a first lost packet arrives at a receiving entity.

7. A method for receiving, by a receiving entity, one or more packets in a system, the method comprising:
    receiving an automatic repeat request (ARQ) configuration (AC) message including ARQ configuration information, wherein the ARQ configuration information includes information on a time window during which the transmitting entity stores transmitted packets for retransmission;
    generating information on a lost packet among the one or more packets, information on a mode of ARQ and information on an argument type used when the receiving entity requests the lost packet;
    transmitting an ARQ feedback (AF) message including the information on the lost packet among the one or more packets, the information on the mode of ARQ and the information on an argument type used when the receiving entity requests the lost packet; and
    receiving the lost packet if retransmission of the lost packet is determined based on the AF message,
    wherein the information on the argument type includes one of a value indicating that the receiving entity send the AF message with a packet counter information and a value indicating that the receiving entity send the AF message with a packet id information and a packet sequence number information.

8. The method of claim 7,
    wherein the AC message includes information on an address of a server where to request the lost packet, and
    wherein the AF message includes information on a number of packet id that has lost packets.

9. The method of claim 7, wherein the AF message includes a mask field where each bit of the mask field corresponds to each of the one or more packets for reporting a packet loss.

10. The method of claim 7, wherein the information on the mode of ARQ comprises at least one of:
    a value indicating that a server transmits the lost packet without considering a delay constraint,
    a value indicating that a receiving entity sends the AF message with a ARQ feedback timestamp field and an arrival deadline field, or
    a value indicating that the receiving entity sends the AF message with a propagation delay field.

11. The method of claim 10,
    wherein the ARQ feedback timestamp field indicates a time at which the AF message is sent from the receiving entity, and
    wherein the arrival deadline field indicates a deadline by which a retransmitted packet for a first lost packet arrives at the receiving entity.

12. A transmitting entity, for transmitting one or more packets in a system, the transmitting entity comprising:
    a transceiver configured to transmit and receive data; and
    a controller configured to:

generate automatic repeat request (ARQ) configuration information including information on a time window during which the transmitting entity stores transmitted packets for retransmission, transmit an ARQ configuration (AC) message including ARQ configuration information, receive an ARQ feedback (AF) message including information on a lost packet among the one or more packets, information on a mode of ARQ and information on an argument type used when a receiving entity requests the lost packet, determine whether to retransmit the lost packet based on the AF message, and retransmit the lost packet based on the determination, wherein the information on the argument type includes one of a value indicating that the receiving entity send the AF message with a packet counter information and a value indicating that the receiving entity send the AF message with a packet id information and a packet sequence number information.

13. The transmitting entity of claim 12, wherein the AC message includes information on an address of a server where to request the lost packet, and wherein the AF message includes information on a number of packet id that has lost packets.

14. The transmitting entity of claim 12, wherein the AF message includes a mask field where each bit of the mask field corresponds to each of the one or more packets for reporting a packet loss.

15. The transmitting entity of claim 12, wherein the information on the mode of ARQ comprises at least one of:

a value indicating that a server transmits the lost packet without considering a delay constraint, a value indicating that a receiving entity sends the AF message with a ARQ feedback timestamp field and an arrival deadline field, or a value indicating that the receiving entity sends the AF message with a propagation delay field.

16. The transmitting entity of claim 15, wherein the ARQ feedback timestamp field indicates a time at which the AF message is sent from the receiving entity, and wherein the arrival deadline field indicates a deadline by which a retransmitted packet for a first lost packet arrives at the receiving entity.

17. The transmitting entity of claim 12, wherein the AF message includes a flag indicating a present time of an arrival deadline field, and wherein the arrival deadline field indicates a deadline by which a retransmitted packet for a first lost packet arrives at a receiving entity.

18. A receiving entity for receiving one or more packets in a system, the receiving entity comprising:

a transceiver configured to transmit and receive data; and a controller configured to:

receive an automatic repeat request (ARQ) configuration (AC) message including ARQ configuration information, wherein the ARQ configuration information includes information on a time window during which the transmitting entity stores transmitted packets for retransmission, generate information on a lost packet among the one or more packets, information on a mode of ARQ and information on an argument type used when the receiving entity requests the lost packet, transmit an ARQ feedback (AF) message including the information on the lost packet among the one or more packets, the information on the mode of ARQ and the information on an argument type used when the receiving entity requests the lost packet, and receive the lost packet if retransmission of the lost packet is determined based on the AF message, wherein the information on the argument type includes one of a value indicating that the receiving entity send the AF message with a packet counter information and a value indicating that the receiving entity send the AF message with a packet id information and a packet sequence number information.

19. The receiving entity of claim 18, wherein the AC message includes information on an address of a server where to request the lost packet, and wherein the AF message includes information on a number of packet id that has lost packets.

20. The receiving entity of claim 18, wherein the AF message includes a mask field where each bit of the mask field corresponds to each of the one or more packets for reporting a packet loss.

21. The receiving entity of claim 18, wherein the information on the mode of ARQ comprises at least one of:

a value indicating that a server transmits the lost packet without considering a delay constraint, a value indicating that a receiving entity sends the AF message with a ARQ feedback timestamp field and an arrival deadline field, or a value indicating that the receiving entity sends the AF message with a propagation delay field.

22. The receiving entity of claim 18, wherein the ARQ feedback timestamp field indicates a time at which the AF message is sent from the receiving entity, and wherein the arrival deadline field indicates a deadline by which a retransmitted packet for a first lost packet arrive at the receiving entity.

* * * * *